US012574169B2

(12) United States Patent (10) Patent No.: US 12,574,169 B2
Gan et al. (45) Date of Patent: Mar. 10, 2026

(54) INFORMATION INDICATION METHOD AND COMMUNICATIONS APPARATUS

(71) Applicant: Huawei Technologies Co., Ltd., Shenzhen (CN)

(72) Inventors: Ming Gan, Shenzhen (CN); Mengshi Hu, Shenzhen (CN); Dandan Liang, Shenzhen (CN); Jian Yu, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/811,471

(22) Filed: Jul. 8, 2022

(65) Prior Publication Data

US 2022/0353025 A1 Nov. 3, 2022

Related U.S. Application Data

(63) Continuation of application No. PCT/CN2021/071070, filed on Jan. 11, 2021.

(30) Foreign Application Priority Data

Jan. 11, 2020 (CN) .......................... 202010028819.4
Mar. 12, 2020 (CN) .......................... 202010172693.8

(51) Int. Cl.
*H04W 72/04* (2023.01)
*H04B 7/0452* (2017.01)
*H04L 5/00* (2006.01)

(52) U.S. Cl.
CPC ......... *H04L 5/0007* (2013.01); *H04B 7/0452* (2013.01); *H04L 5/0046* (2013.01); *H04W 72/04* (2013.01)

(58) Field of Classification Search
CPC .... H04B 7/0452; H04W 72/04; H04W 72/20; H04W 72/23
See application file for complete search history.

(56) References Cited

U.S. PATENT DOCUMENTS

2018/0302858 A1 10/2018 Son et al.
2019/0158158 A1 5/2019 Li et al.
(Continued)

FOREIGN PATENT DOCUMENTS

CN 103299686 A 9/2013
CN 105813199 A 7/2016
CN 108964858 A 12/2018
CN 109315012 A 2/2019
(Continued)

OTHER PUBLICATIONS

Vermani, S., et al., "Further Ideas on EHT Preamble Design", doc.: IEEE 802.11-19/1870r4, Nov. 11, 2019, 18 Pages.
(Continued)

*Primary Examiner* — Bo Hui A Zhu
*Assistant Examiner* — Alvin Zhu
(74) *Attorney, Agent, or Firm* — Slater Matsil, LLP

(57) ABSTRACT

This application relates to the field of wireless fidelity technologies, and in particular to an information indication method. The method includes: An access point determines resource indication information, and sends the resource indication information. The resource indication information includes a plurality of bit sequences. A first bit sequence in the plurality of bit sequences corresponds to a first resource unit. The first resource unit is a resource unit in a resource block set that is allocated to a first station (STA) or a plurality of STAs. The resource block set includes at least two resource units.

27 Claims, 15 Drawing Sheets

EHT PPDU

(56) References Cited

U.S. PATENT DOCUMENTS

| | | | | |
|---|---|---|---|---|
| 2021/0045151 A1* | 2/2021 | Chen | .................... | H04W 72/23 |
| 2021/0377971 A1* | 12/2021 | Park | .................... | H04W 74/006 |
| 2022/0272715 A1* | 8/2022 | Iwai | .................... | H04W 72/23 |

FOREIGN PATENT DOCUMENTS

| | | | |
|---|---|---|---|
| JP | 2018532303 A | 11/2018 |
| WO | 2019240792 A1 | 12/2019 |
| WO | 2021030233 A1 | 2/2021 |
| WO | 2021141437 A1 | 7/2021 |

OTHER PUBLICATIONS

"IEEE Standard for Information technology—Telecommunications and information exchange between systems Local and metropolitan area networks—Specific requirements Part 11: Wireless LAN Medium Access Control (MAC) and Physical Layer (PHY) Specifications", IEEE Computer Society, IEEE Std 802.11-2016 (Revision of IEEE Std. 802.11-2012), 3534 Pages.

"IEEE P802.11ax/D6.0 Draft Standard for Information technology—Telecommunications and information exchange between systems Local and metropolitan area networks—Specific requirements Part 11: Wireless LAN Medium Access Control (MAC) and Physical Layer (PHY) Specifications—Amendment 1: Enhancements for High Efficiency WLAN", IEEE P802.11ax /D6.0, Nov. 2019 , (amendment to IEEE P802.11REVmd/D3.0), 780 Pages.

Rui Cao et al, EHT Preamble Design, IEEE 802.11-19/1540r7, Nov. 2019, total 20 pages.

* cited by examiner

AP                                    STA

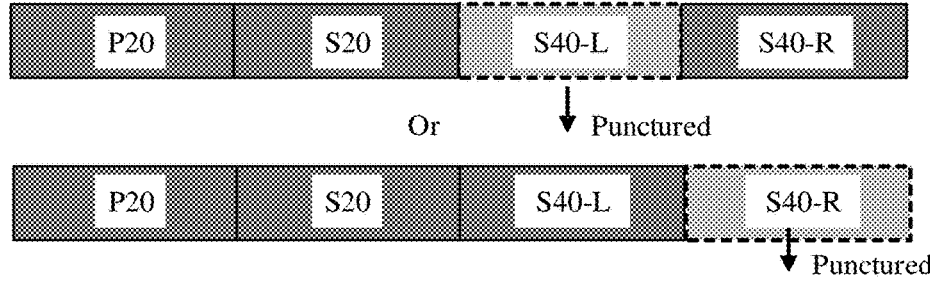
FIG. 5
FIG. 6
FIG. 7

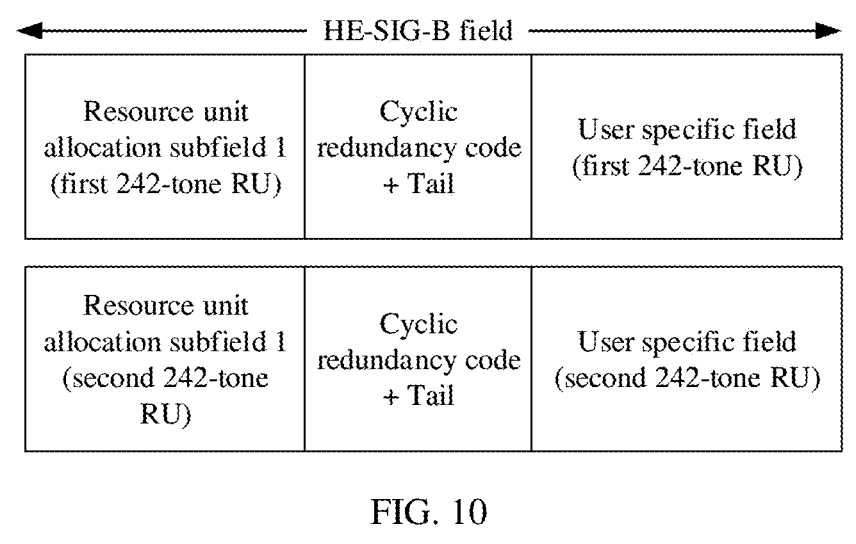

| ← | HE-SIG-B field | → |
|---|---|---|
| Resource unit allocation subfield 1 (first 242-tone RU) | Cyclic redundancy code + Tail | User specific field (first 242-tone RU) |

| Resource unit allocation subfield 1 (second 242-tone RU) | Cyclic redundancy code + Tail | User specific field (second 242-tone RU) |

FIG. 10

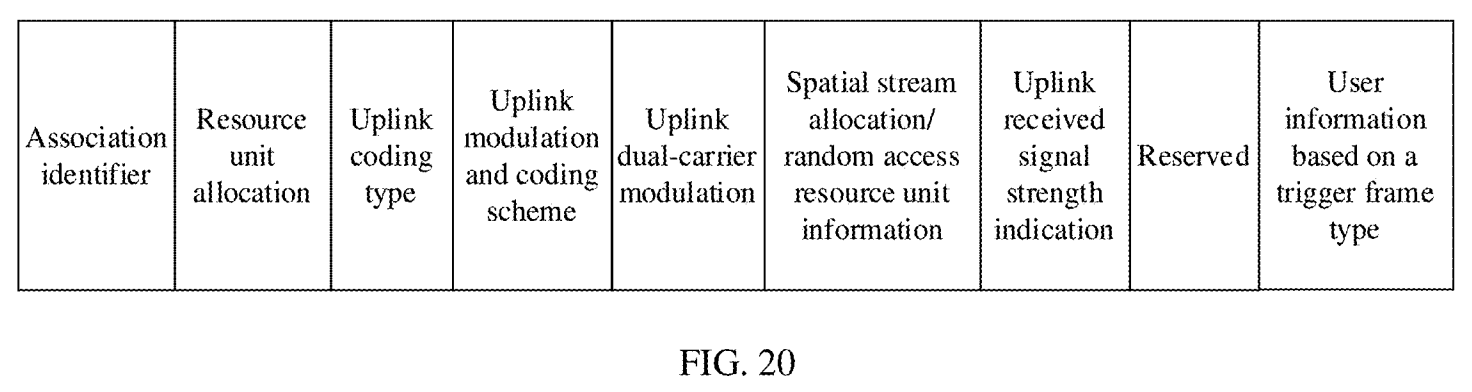

| Association identifier | Resource unit allocation | Uplink coding type | Uplink modulation and coding scheme | Uplink dual-carrier modulation | Spatial stream allocation/ random access resource unit information | Uplink received signal strength indication | Reserved | User information based on a trigger frame type |
|---|---|---|---|---|---|---|---|---|

FIG. 20

INFORMATION INDICATION METHOD AND COMMUNICATIONS APPARATUS

CROSS-REFERENCE TO RELATED APPLICATIONS

This application is a continuation of International Application No. PCT/CN2021/071070, filed on Jan. 11, 2021, which claims priority to Chinese Patent Application No. 202010028819.4, filed on Jan. 11, 2020 and Chinese Patent Application No. 202010172693.8, filed on Mar. 12, 2020. All of the aforementioned patent applications are hereby incorporated by reference in their entireties.

TECHNICAL FIELD

This application relates to the field of wireless fidelity technologies, and in particular, to an information indication method and a communications apparatus.

BACKGROUND

To support orthogonal frequency division multiple access (OFDMA) transmission, a frequency band resource is divided into several resource units in 802.11ax, and each station or each group of stations can perform transmission on only one of the resource units. In other words, the following is currently supported: Only one resource unit is allocated to one station or a plurality of users. However, the following may be supported in the future: A plurality of resource units are allocated to one or more stations. How to allocate a plurality of resource units to one or more stations is a currently to-be-resolved problem.

SUMMARY

This application provides an information indication method and a communications apparatus. Two content channels are used to transmit an HE-SIG B to indicate that a plurality of resource units are allocated to one or more stations, to reduce signaling overheads.

According to a first aspect, an information indication method is provided. The method includes the following:

An access point (AP) determines resource indication information. The resource indication information includes a plurality of bit sequences. A first bit sequence in the plurality of bit sequences corresponds to a first resource unit. The first resource unit is a resource unit in a resource block set that is allocated to a first station (STA) or a plurality of STAs. The resource block set includes at least two resource units.

The AP sends the resource indication information.

Optionally, for the resource indication information in the first aspect, refer to an implementation of the resource indication information in a specific embodiment.

According to a second aspect, an information indication method is provided. The method includes the following:

An access point (AP) generates first indication information. The first indication information is used to indicate that a plurality of stations (STA) perform full-bandwidth multi-user (MU-MIMO) transmission on a noncontiguous bandwidth.

The AP sends the first indication information.

Optionally, for the first indication information in the second aspect, refer to an implementation of the indication information in a specific embodiment.

According to a third aspect, a communications apparatus is provided. The communications apparatus includes a module configured to perform the method according to the first aspect or any one of the possible implementations of the first aspect, or the communications apparatus includes a module configured to perform the method according to the second aspect or any one of the possible implementations of the second aspect.

According to a fourth aspect, an embodiment of this application provides a computer-readable storage medium, configured to store a computer program. The computer program includes instructions for performing the first aspect or any one of the possible implementations of the first aspect, or instructions for performing the second aspect or any one of the possible implementations of the second aspect.

According to a fifth aspect, an embodiment of this application provides a computer program. The computer program includes instructions for performing the first aspect or any one of the possible implementations of the first aspect, or instructions for performing the second aspect or any one of the possible implementations of the second aspect.

According to a sixth aspect, an embodiment of this application provides a communications system. The communications system includes the communications apparatus and a station provided in the third aspect.

BRIEF DESCRIPTION OF THE DRAWINGS

FIG. 5 shows an 80 M multi-user puncturing mode 2 in 802.11ax;

FIG. 6 shows a 160 M multi-user puncturing mode 1 in 802.11ax;

FIG. 7 shows a 160 M multi-user puncturing mode 2 in 802.11ax;

FIG. 10 is a schematic diagram of a frame structure of a 40 MHz HE-SIG-B according to an embodiment of this application;

FIG. 20 is a schematic diagram of a structure of a user information field in a trigger frame according to an embodiment of this application;

DETAILED DESCRIPTION OF ILLUSTRATIVE EMBODIMENTS

To make the objectives, technical solutions and advantages of the embodiments of this application clearer, the following further describes the embodiments of this application in detail with reference to the accompanying drawings.

The embodiments of this application may be applied to a scenario of a wireless local area network (WLAN); and may be applied to an IEEE 802.11 system standard, for example, an IEEE 802.11ax standard, or a next-generation standard or a further next-generation standard. Alternatively, the embodiments of this application may be applied to a wireless local area network system, for example, an Internet of things (IoT) or an Internet of vehicles (V2X). Certainly, the embodiments of this application may be further applied to another possible communications system, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5G communications system.

Figure 1:
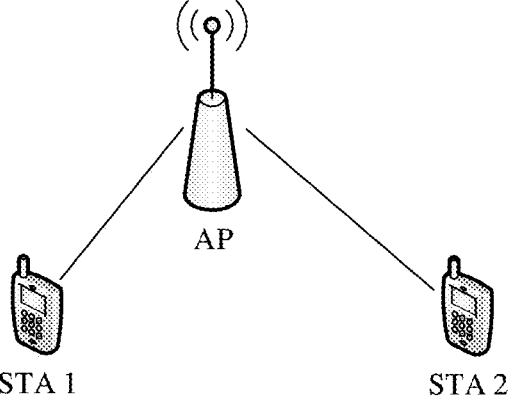
FIG. 1 shows a network architecture of a wireless local area network to which an embodiment of this application is applicable.

For example, FIG. 1 is a diagram of a network architecture of a WLAN to which an embodiment of this application is applicable. FIG. 1 uses an example in which the WLAN includes one AP and a STA 1 and a STA 2 that are associated with the AP. The AP may schedule a radio resource for the STA 1 and the STA 2, and transmit data for the STA 1 and the STA 2 on the scheduled radio resource. The data includes uplink data information and/or downlink data information. It should be understood that a quantity of APs and a quantity of STAs in FIG. 1 are merely an example. There may be more or less APs and STAs. The AP may communicate with the STA 1 or the STA 2, or the AP may communicate with the STA 1 and the STA 2. It should be understood that, if the WLAN includes a plurality of APs and a plurality of STAs, this embodiment of this application is also applicable to communication between APs. For example, the APs may communicate with each other by using a distributed system (distributed system, DS). Any AP may schedule a radio resource for a STA associated with the AP and/or a STA not associated with the AP, and transmit data for the STA on the scheduled radio resource. This embodiment of this application is also applicable to communication between STAs.

The station STA in this embodiment of this application may be various user terminals, user apparatuses, access apparatuses, subscriber stations, subscriber units, mobile stations, user agents, user equipment, or the like in another name that have a wireless communication function. The user terminal may include various handheld devices, vehicle-mounted devices, wearable devices, computing devices, or other processing devices connected to a wireless modem that have a wireless communication function; and various forms of user equipment (UE), mobile stations (MS), terminals, terminal equipment, portable communications devices, handheld devices, portable computing devices, entertainment devices, game devices or systems, global positioning system devices or any other proper devices configured to perform network communication by using a wireless medium, and the like. Herein, for ease of description, the devices mentioned above are collectively referred to as a station or a STA. The access point AP in this embodiment of this application is an apparatus that is deployed in a wireless communications network and that provides a wireless communication function for the STA associated with the AP. The access point AP may be used as a hub of the communications system. The AP may be a communications device such as a base station, a router, a gateway, a repeater, a communications server, a switch, or a bridge. The base station may include various forms of macro base stations, micro base stations, relay stations, and the like. Herein, for ease of description, the devices mentioned above are collectively referred to as an access point AP.

Figure 2:
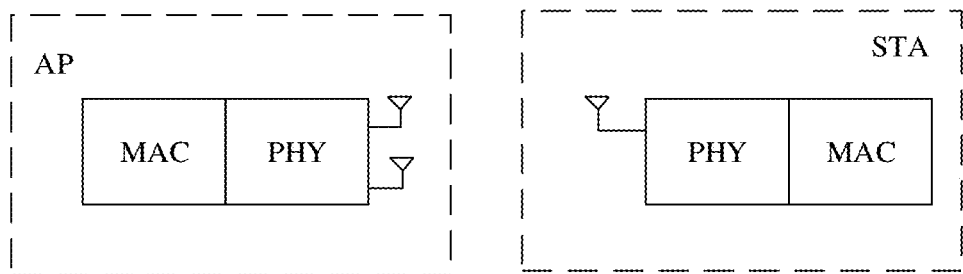
FIG. 2 is a diagram of internal structures of an access point and a station according to an embodiment of this application.

Specifically, the AP and the STA in this application may be an AP and a STA to which an IEEE 802.11 system standard is applicable. FIG. 2 is a diagram of internal structures of an AP and a STA according to an embodiment of this application. In the 802.11 system standard, a physical layer (PHY) and a media access control (MAC) part in 802.11 are mainly focused. Therefore, the STA provided in this embodiment of this application is generally a terminal product that supports MAC layer and PHY layer in the 802.11 system standard, for example, a mobile phone or a notebook computer. It should be noted that, although FIG. 2 is a diagram of a structure of a multi-antenna AP and a single-antenna STA, in an actual scenario, the AP and the STA each may include a plurality of antennas and each may be a device having more than two antennas.

Figures 3, 4:
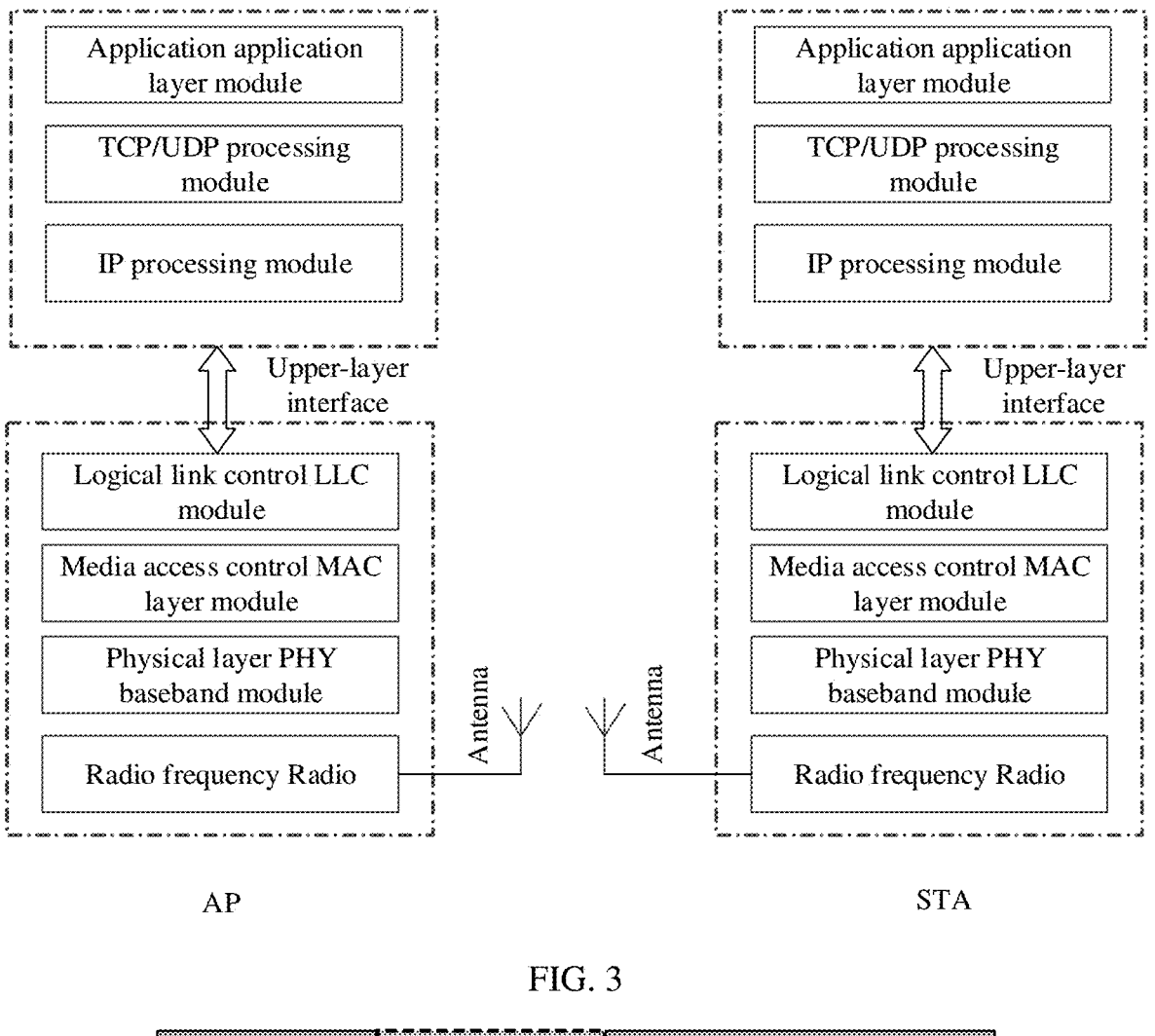
FIG. 3 is another diagram of internal structures of an access point and a station according to an embodiment of this application.
FIG. 4 shows an 80 M multi-user puncturing mode 1 in 802.11ax.

FIG. 3 is another diagram of internal structures of an AP and a STA according to an embodiment of this application. The AP and the STA each include a PHY baseband module, a MAC layer module, a logical link control (LLC) layer module, and a radio frequency module, namely, an antenna that belong to a bottom layer; and an internet protocol (IP) processing module, a transmission control protocol (TCP)/user datagram protocol (UDP) processing module, and an application layer module that belong to an upper layer. Information transmission is implemented between the bottom layer and the upper layer by using an upper-layer interface.

The AP communicates with the STA. The AP may allocate a resource to the STA. The STA performs data transmission on the allocated resource. For example, a Wi-Fi protocol before 802.11ax, for example, 802.11ac requires that transmission needs to occupy a contiguous bandwidth, including four types of bandwidths: 20 MHz, 40 MHz, 80 MHz, and 160 MHz. One 20 MHz is denoted as primary 20 MHz. If 20 MHz in a bandwidth is occupied by transmission of another station, a PPDU transmission bandwidth needs to be reduced. The reduced bandwidth needs to include primary 20 MHz. All other 20 MHz consecutive to the primary 20 MHz is idle and available. For example, first 20 MHz in a contiguous 80 M bandwidth is primary 20 MHz, but a second 20 MHz channel is busy. In this case, according to a requirement for a contiguous bandwidth, only a PPDU of the primary 20 MHz can be transmitted, that is, idle 40 MHz is wasted in the 80 MHz bandwidth.

To aggregate more channels to form a larger available bandwidth, a preamble punctured transmission manner is proposed in the 802.11ax protocol. It is allowed to aggregate inconsecutive channels together. In the foregoing example, the access point is allowed to send a 20 MHz+40 MHz PPDU, to more efficiently use an idle channel. Specifically, in the four types of transmission bandwidths specified in the 802.11ax standard, it is possible to implement the preamble punctured transmission manner only on an 80 MHz bandwidth and a 160 MHz bandwidth in the four types of transmission bandwidths. The following separately describes four preamble punctured transmission manners proposed in 802.11ax.

The 80 MHz bandwidth includes primary 20 MHz P20, secondary 20 MHz S20, and secondary 40 MHz S40. Herein, S40 is further divided into S40-L (left 20 MHz in S40) and S40-R (right 20 MHz in S40). A preamble punctured transmission manner corresponding to 80 MHz is shown in FIG. 4 and FIG. 5. In FIG. 4, only S20 is punctured in the 80 MHz bandwidth. In FIG. 5, only one 20 MHz in S40 is punctured in the 80 MHz bandwidth.

The 160 MHz bandwidth includes primary 20 MHz P20, secondary 20 MHz S20, secondary 40 MHz S40, and secondary 80 MHz S80. Herein, S40 is further divided into S40-L and S40-R. A preamble punctured manner corresponding to 160 MHz is shown in FIG. 6 and FIG. 7. In FIG. 6, only S20 is punctured in primary 80 MHz (including P20, S20, and S40) in the 160 MHz bandwidth, and 20 MHz in secondary 80 MHz may be punctured. This is indicated by using an HE-SIG-B field in 802.11ax. In FIG. 7, primary 40 MHz (including P20 and S20) in primary 80 MHz (including P20, S20, and S40) in the 160 MHz bandwidth is not punctured, and 20 MHz in secondary 40 MHz and secondary 80 MHz may be punctured. This is indicated by using an HE-SIG-B field in 802.11ax.

The two preamble punctured transmission manners for the 80 MHz bandwidth and the two preamble punctured transmission manners for the 160 MHz bandwidth in 802.11ax may be indicated by using indication information. The indication information is located in a high efficiency signal A (HE-SIG-A) field of a PPDU preamble in 802.11ax. It should be noted that neither a second preamble puncturing mode in the 80 MHz bandwidth nor two preamble puncturing modes in the 160 MHz bandwidth can specifically indicate specific punctured 20 MHz. A receive end needs to further parse resource allocation indication information in a common information part field of a next field: an HE-SIG-B field in an HE PPDU preamble in 802.11ax. The HE-SIG-B is mainly used to: for a plurality of stations, perform downlink multi-user transmission including OFDMA and MU-MIMO, and provide resource unit allocation information and a station transmission parameter. In other words, the preamble punctured transmission manner in 802.11ax is applicable to only multi-user transmission.

Figure 8:
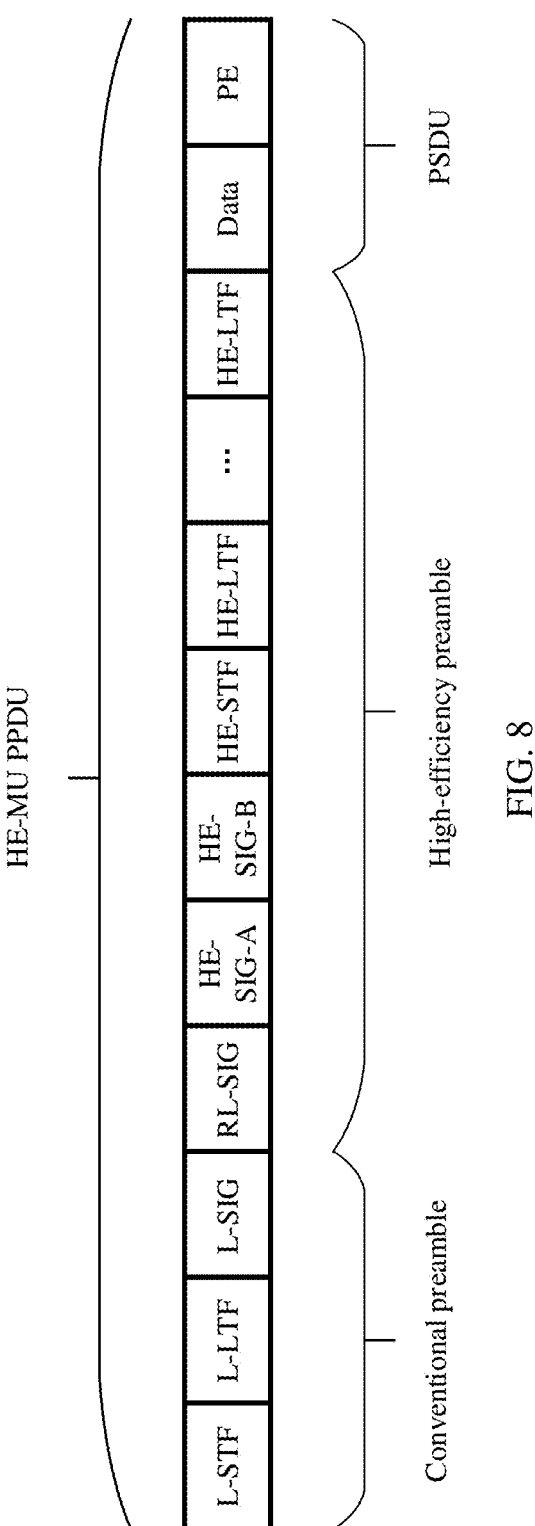
FIG. 8 is a schematic diagram of a frame structure of an HE MU PPDU according to an embodiment of this application.

FIG. 8 shows a multi-user frame format proposed in the 802.11ax protocol, that is, a high efficiency multi-user physical protocol data unit (HE MU PPDU). The frame format includes three parts: a legacy preamble (L-preamble), a high efficiency preamble (HE-preamble), and a physical layer convergence protocol service data unit (PSDU). The HE-preamble further includes fields such as a repeated legacy signal (RL-SIG), an HE-SIG-A, a high efficiency signal B (HE-SIG-B), a high efficiency-short training field (HE-STF), and a high efficiency-long training field (HE-LTF).

Figure 9:
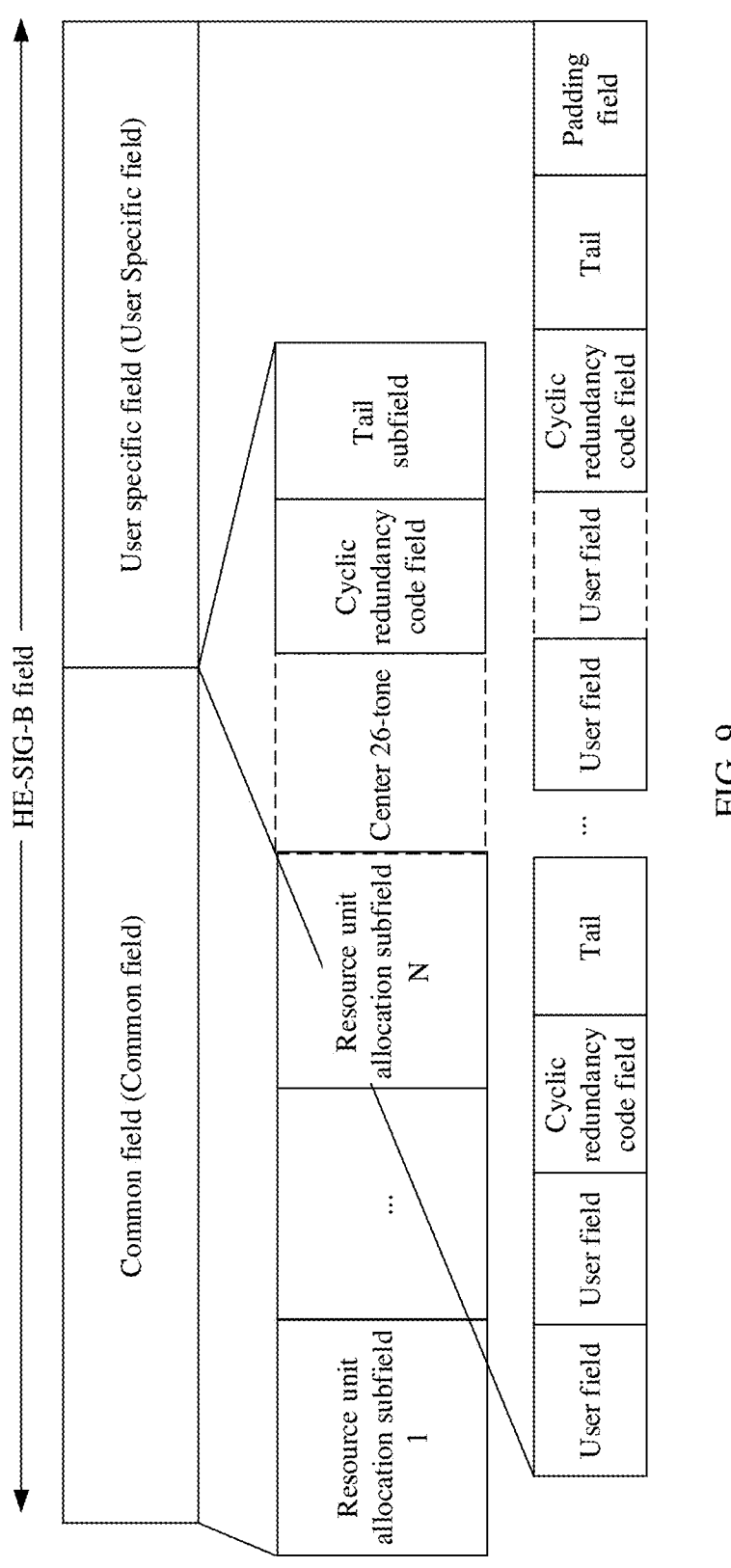
FIG. 9 is a schematic diagram of a structure of an HE-SIG-B according to an embodiment of this application.

FIG. 9 shows an HE-SIG B field format proposed in the 802.11ax protocol. The HE-SIG-B is divided into two parts. A first part is a common field, including 1 to N resource unit allocation subfields (RU Allocation subfield), a center 26-tone resource unit indication field for a bandwidth greater than or equal to 80 MHz, a cyclic redundancy code (CRC) used for check, and a tail subfield used for cyclic decoding. In addition, in a user specific field, there are 1 to M user fields in a resource unit allocation sequence. Herein, generally, every two of the M user fields are in one group, and every two user fields are followed by one CRC and one tail field except a final group. The final group may include one or two user fields. Therefore, the user field in the final group is indicated by using a dashed line. A tail field after the final group of user fields may be followed by a padding field.

The AP may add the resource allocation information to the HE-SIG-B, to indicate an allocated RU to the STA. When an orthogonal frequency division multiple access (OFDMA) technology and a multi-user multiple-input multiple-output (MU-MIMO) technology are applied, a spectral bandwidth is divided into several resource units (RU) in the WLAN protocol. The IEEE 802.11ax protocol specifies that a spectral bandwidth may be divided into a plurality of types of RUs for 20 MHz, 40 MHz, 80 MHz, and 160 MHz that include a 26-tone RU, a 52-tone RU, a 106-tone RU, a 242-tone RU (a largest RU in a 20 MHz bandwidth), a 484-tone RU (a largest RU in a 40 MHz bandwidth), a 996-tone RU (a largest RU in an 80 MHz bandwidth), and a 2*996-tone RU (a largest RU in a 160 MHz bandwidth). Each RU includes consecutive tones. For example, the 26-tone RU is an RU including 26 consecutive tones. Spectral bandwidth resource division is indicated by using one or more 8-bit sequences. Herein, every 8 bits correspond to one 20 MHz in a spectral bandwidth.

For example, in the 802.11ax protocol, an index table of resource unit allocation subfields is shown in Table 1. Because the index table is used to indicate an allocated resource, the index table may also be referred to as a resource allocation information table.

TABLE 1

| Resource allocation information table | | | | | | | | | | |
| Resource unit allocation subfield (B7, B6, B5, B4, B3, B2, B1, B0) | #1 | #2 | #3 | #4 | #5 | #6 | #7 | #8 | #9 | Quantity |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |

TABLE 1-continued

Resource allocation information table

| Resource unit allocation subfield (B7, B6, B5, B4, B3, B2, B1, B0) | #1 | #2 | #3 | #4 | #5 | #6 | #7 | #8 | #9 | Quantity |
|---|---|---|---|---|---|---|---|---|---|---|
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | 106 | | | | 8 |
| 00011$y_2y_1y_0$ | 106 | | | | — | 52 | | 52 | | 8 |
| 00100$y_2y_1y_0$ | 26 | 26 | 26 | 26 | 26 | 106 | | | | 8 |
| 00101$y_2y_1y_0$ | 26 | 26 | 52 | | 26 | 106 | | | | 8 |
| 00110$y_2y_1y_0$ | 52 | | 26 | 26 | 26 | 106 | | | | 8 |
| 00111$y_2y_1y_0$ | 52 | | 52 | | 26 | 106 | | | | 8 |
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |
| 01010$y_2y_1y_0$ | 106 | | | | 26 | 52 | | 26 | 26 | 8 |
| 01011$y_2y_1y_0$ | 106 | | | | 26 | 52 | | 52 | | 8 |
| 0110$y_1y_0z_1z_0$ | 106 | | | | — | 106 | | | | 16 |
| 01110000 | 52 | | 52 | | — | 52 | | 52 | | 1 |
| 01110001 | 242-tone RU null (zero stations)-denoted as 242 (0) | | | | | | | | | 1 |
| 01110010 | A resource unit allocation subfield of an HE-SIG-B content channel includes a 484-tone RU with zero user field, which is denoted as 484 (0). | | | | | | | | | 1 |
| 01110011 | A resource unit allocation subfield of an HE-SIG-B content channel includes a 996-tone RU with zero user field, which is denoted as 996 (0). | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | | | | 26 | 106 | | | | 64 |
| 11000$y_2y_1y_0$ | 242, denoted as 242 (n), n = 1 to 8 | | | | | | | | | 8 |
| 11001$y_2y_1y_0$ | 484, denoted as 484 (n), n = 1 to 8 | | | | | | | | | 8 |
| 11010$y_2y_1y_0$ | 996, denoted as 996 (n), n = 1 to 8 | | | | | | | | | 8 |
| 11011$y_2y_1y_0$ | Reserved | | | | | | | | | 8 |
| 111$x_4x_3x_2x_1x_0$ | Reserved | | | | | | | | | 32 |

40

A concept of a content channel (CC) is further introduced in the 802.11ax protocol. When a bandwidth is only 20 MHz, the HE-SIG-B includes only one CC. The CC includes one resource unit allocation subfield used to indicate an allocated RU in 20 MHz. The resource unit allocation subfield occupies 8 bits that may be used to indicate all possible RU permutation and combination manners in the 20 MHz bandwidth in an indexing manner. For an RU whose size is greater than or equal to a 106-tone RU, a quantity of users in SU/MU-MIMO transmission in the RU or a quantity of user information fields, for example, the letter x or y in Table 1 further needs to be indicated. For details, refer to the 802.11ax protocol.

If a transmission bandwidth is greater than 20 MHz, an RL-SIG field and an HE-SIG-A field in the L-preamble and the HE-preamble are repeatedly transmitted on each 20 MHz, and the HE-SIG B uses a "1212" transmission method, that is, the HE-SIG B includes two CCs. One CC is transmitted on each odd-numbered 20 MHz in the transmission bandwidth. The CC includes resource allocation information of the subchannels of the odd-numbered 20 MHz and station information transmitted on the subchannels of the odd-numbered 20 MHz. The other CC is transmitted on each even-numbered 20 MHz in the transmission bandwidth. The other CC includes resource allocation information of the subchannels of the even-numbered 20 MHz and station information transmitted on the subchannels of the even-numbered 20 MHz. It should be understood that content of the resource unit allocation subfield is partially displayed in each of the two CCs. Through reading the two CCs, the STA may learn of RUs obtained after dividing a spectral bandwidth resource.

For example, FIG. 10 shows a structure of a 40 MHz HE-SIG-B. When a bandwidth is 40 MHz, there are two CCs: a CC 1 and a CC 2. The CC 1 includes a resource unit allocation subfield in a range including odd-numbered 20 MHz (that is, first 20 MHz) and a corresponding user specific field. The CC 2 includes a resource unit allocation subfield in a range including even-numbered 20 MHz (that is, second 20 MHz) and a corresponding user specific field.

For another example, when a bandwidth is 80 MHz, there are also two CCs. The two CCs are respectively a CC 1 and a CC 2. The CC 1 includes a resource unit allocation subfield in a range including an odd-numbered 242-tone RU (that is, first 20 MHz and third 20 MHz) and a corresponding user specific field. The CC 2 includes a resource unit allocation subfield in a range including an even-numbered 242-tone RU (that is, second 20 MHz and fourth 20 MHz) and a corresponding user specific field.

Although a plurality of RU allocation modes are set for the resource unit allocation subfield shown in Table 1, allocation of 160 MHz is supported at most, and allocation of a larger bandwidth may be supported in the future, for example, 320 MHz. Currently, the 802.11ax protocol does not specify all possible RU permutation and combination manners in 320 MHz, and does not have an allocation indication scheme for a 320 MHz bandwidth.

In addition, to reduce complexity of sending and receiving, in OFDMA transmission, only one resource block may be allocated to each station or each group of stations for information transmission. Herein, each group of stations indicates that the group of stations performs MU-MIMO transmission on the corresponding resource block. In other words, the following is currently supported: Only one RU is allocated to one user. The following is not supported: A plurality of RUs are allocated to one user. To improve spectrum utilization, it may be supported in the future that a plurality of RUs are allocated to one user. How to allocate a plurality of RUs to one user is a currently to-be-resolved problem.

In addition, the AP may communicate with one STA. This is also referred to as single-user transmission. In the 802.11ax protocol, the single-user transmission is supported only on a contiguous bandwidth. However, to improve spectrum utilization, in a next-generation protocol of 802.11ax, for example, 802.11be, the single-user transmission may be supported on a noncontiguous bandwidth. In other words, some subchannels in the bandwidth are allowed to be punctured (for example, 20 MHz is used as a unit). Similarly, the AP may also communicate with a plurality of STAs. For example, a plurality of STAs perform full-bandwidth MU-MIMO transmission. However, in the 802.11ax protocol, the 802.11ax protocol is supported only on a contiguous bandwidth, and the single-user transmission is supported only on a contiguous bandwidth. In the future, the full-bandwidth MU-MIMO transmission may be supported on a noncontiguous bandwidth. For single-user punctured transmission and full-bandwidth MU-MIMO transmission, how an AP indicates an allocated RU to a STA is a currently to-be-resolved problem. It should be understood that the single-user punctured transmission indicates that one station performs transmission on a plurality of inconsecutive RUs. Similarly, the full-bandwidth MU-MIMO punctured transmission indicates that a group of stations performs MU-MIMO transmission on inconsecutive RUs.

To resolve the foregoing technical problem, an embodiment of this application provides an information indication method. In this method, an AP may reuse a field in a PPDU preamble to indicate a single-user punctured PPDU or a multi-user punctured PPDU. In addition, the AP reuses a bit sequence in a resource allocation information table to indicate that a plurality of RUs are allocated to one station in single-user transmission or that a plurality of RUs are allocated to one or more stations in multi-user transmission. In comparison with the MU punctured transmission method in 802.11ax, signaling overheads can be reduced in this application.

With reference to the accompanying drawings, the following separately describes the single-user punctured transmission method and the full-bandwidth MU-MIMO punctured transmission method according to the embodiments of this application.

In the current 802.11ax standard, the single-user transmission and the full-bandwidth MU-MIMO transmission are supported only on a contiguous bandwidth. In other words, a subchannel in a bandwidth is not allowed to be punctured. However, to improve spectrum utilization, in a next-generation protocol of 802.11ax, for example, the 802.11be standard, the single-user punctured transmission and the full-bandwidth MU-MIMO punctured transmission may be supported. In other words, a single user and users in full-bandwidth MU-MIMO are allowed to perform transmission on a punctured bandwidth.

Therefore, in this embodiment of this application, when the AP needs to perform downlink single-user punctured transmission, it is further required to indicate whether a to-be-transmitted PPDU is a single-user punctured PPDU or a multi-user punctured PPDU. Similarly, when the AP needs to perform downlink full-bandwidth MU-MIMO transmission, it is further required to indicate that a PPDU is to be transmitted through full-bandwidth MU-MIMO punctured transmission.

Specifically, in this embodiment of this application, first indication information may be used to notify the STA whether the to-be-transmitted PPDU is a single-user punctured PPDU or a multi-user punctured PPDU, which may be considered as different transmission modes. It may be understood that the single-user punctured PPDU is in a first transmission mode, and the multi-user punctured PPDU is in a second transmission mode. In this case, the first indication information may be used to indicate the first transmission mode and the second transmission mode. Specifically, the indication information may be carried in one or more fields of the PPDU. The following uses a possible structure of the PPDU as an example to describe several implementations of the first indication information.

In another implementation, in this embodiment of this application, the first indication information may be used to notify the STA that the PPDU is to be transmitted through single-user full-bandwidth transmission, single-user full-bandwidth punctured transmission, full-bandwidth MU-MIMO transmission, full-bandwidth MU-MIMO punctured transmission, or OFDMA transmission. The MU-MIMO transmission is also allowed for a resource block in the OFDMA transmission. A resource block in the OFDMA transmission may also be punctured.

Optionally, the single-user full-bandwidth punctured transmission and the full-bandwidth MU-MIMO punctured transmission may be combined into a mode A. In this mode, an EHT signal field includes information related to resource allocation, for example, information related to puncturing. This is specifically mentioned in a solution (4).

Optionally, the full-bandwidth MU-MIMO transmission and the OFDMA transmission may combined into a mode B. In this mode, whether an EHT signal field includes information related to resource allocation such as RU resource allocation information is further determined by using another field such as a compression mode indication field in 802.11ax. The EHT signal field that does not include the information related to the resource allocation may be used in the full-bandwidth MU-MIMO transmission and optionally in the single-user transmission. The EHT signal field that includes the information related to the resource allocation may be used in the OFDMA transmission and optionally in the single-user transmission.

Figure 11:
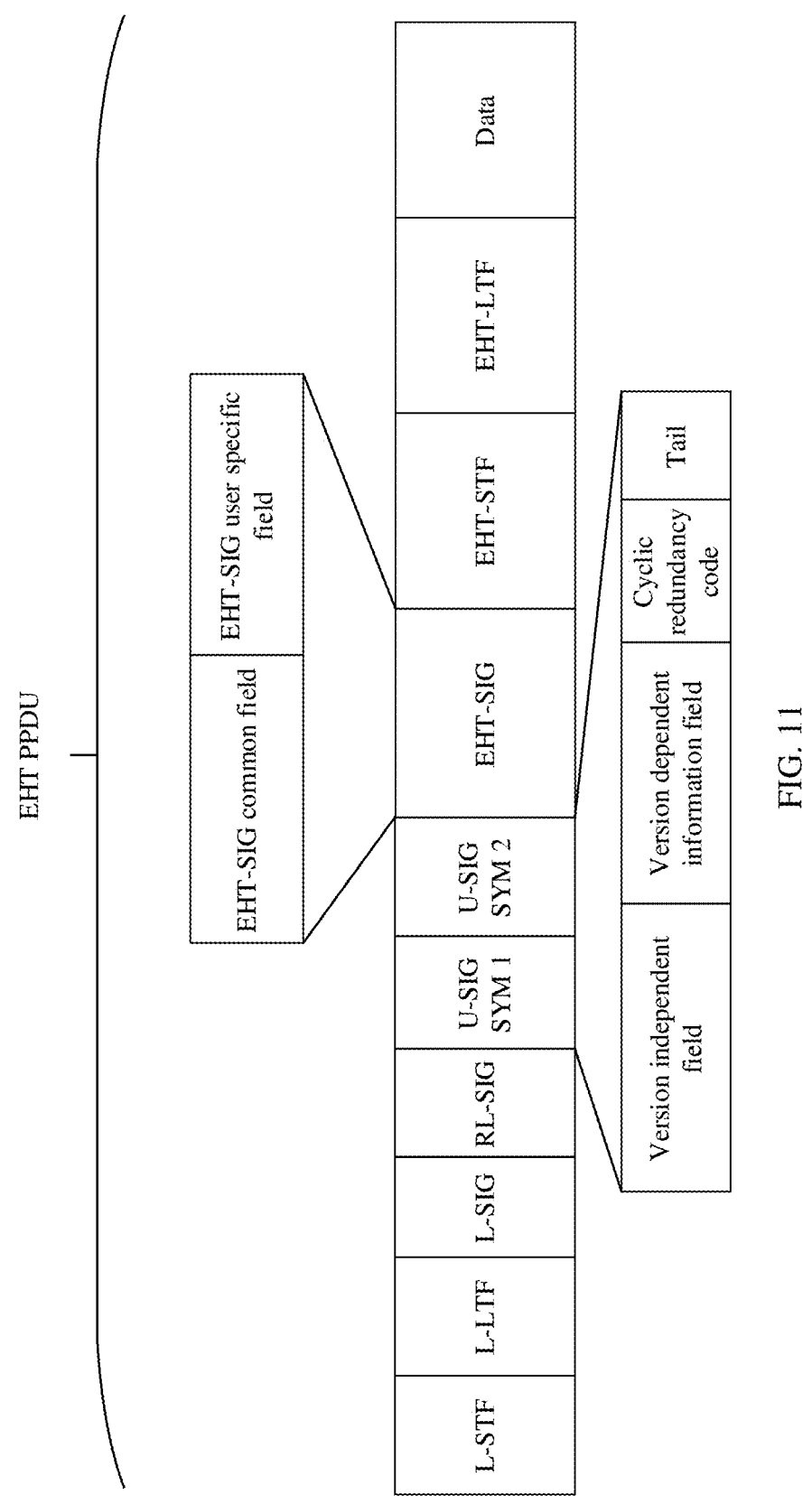
FIG. 11 is a schematic diagram of a frame structure of an EHT PPDU according to an embodiment of this application.

The PPDU in this embodiment of this application may be an EHT PPDU. FIG. 11 shows an example of a frame structure of the EHT PPDU. As shown in FIG. 11, the EHT PPDU may include fields such as an L-preamble field, a binary phase shift keying (binary phase shift keying, BPSK) symbol field, an extremely high throughput (extremely high throughput, EHT) signal field, an extremely high throughput short training field (extremely high throughput short training field, EHT-STF), an extremely high throughput long training field (extremely high throughput long training field, EHT-LTF), and a data (data) field. The L-preamble field may include a legacy signal field (legacy signal field, L-STF) and a legacy long training field (legacy long training field, L-LTF). The BPSK symbol field may include an L-SIG field, an RL-SIG field, and a U-SIG field.

In this embodiment of this application, the resource indication information used to indicate the RU allocated to the STA may be carried in the EHT signal field. The EHT signal field may include a common field and a user specific field. The resource allocation information may be carried in the common field. An identifier of the station may be carried in the user specific field.

The U-SIG field may include a version independent information (version independent info) field and a version dependent information (version dependent info) field. The version independent info field may include a 3-bit Wi-Fi version field, a 1-bit downlink/uplink field, a BSS color field with at least 6 bits, a TxOP field with at least 7 bits, a CRC field with at least 4 bits, and a 6-bit tail field. Further, the version independent info field may further include a bandwidth field. The version dependent info field may include a PPDU format field or the like, and may further include one or more of a modulation and coding scheme field, a spatial flow field, an encoding field, and the like.

In an implementation of the first indication information, the first indication information may be carried in a field in the U-SIG field. For ease of description, in this embodiment of this application, the field is referred to as a first field. The first field may be a defined field in the U-SIG field, or may be a newly added field in the U-SIG field. The first field may occupy two or more bits. For example, when a value of the first field is a first value, for example, "00", it may indicate a single-user PPDU and no puncturing; when a value of the first field is a second value, for example, "01", it may indicate a single-user PPDU and puncturing; when a value of the first field is a third value, for example, "10", it may indicate a multi-user PPDU and no puncturing; or when a value of the first field is a fourth value, for example, "11", it may indicate a multi-user PPDU and puncturing. It should be noted that in this embodiment of this application, the value of the first field may also be understood as a value carried in the first field in some embodiments.

For example, the first field may be a defined field in the U-SIG field, for example, a PPDU format field. It should be understood that if the first field is a newly added field in the U-SIG field, the first field is located before the common field in the EHT signal field.

In another implementation of the first indication information, the first indication information may be alternatively carried in two fields in the U-SIG field. For ease of description, in this embodiment of this application, the two fields are respectively referred to as a first field and a second field. The first field and the second field may be both defined fields in the U-SIG field, or newly added fields in the U-SIG field. Alternatively, the first field is a defined field in the U-SIG field, and the second field is a newly added field in the U-SIG field. Alternatively, the first field is a newly added field in the U-SIG field, and the second field is a defined field in the U-SIG field. The first field is used to indicate a format of a to-be-transmitted PPDU, including a single-user PPDU or a multi-user PPDU. The second field is used to indicate whether to perform punctured transmission. For example, the second field occupies one or more bits. When a value of the second field is a first value, for example, "1", it may indicate puncturing. Correspondingly, when the value of the second field is a second value, for example, "0", it may indicate no puncturing.

For example, the first field is a PPDU format field, and the second field may be a newly added field in the U-SIG field, for example, a puncturing field. It should be noted that when the value of the second field indicates puncturing, the common field included in the EHT signal field in the PPDU exists, and the EHT signal field may carry the resource allocation information. For example, the EHT signal field includes a resource unit allocation subfield used to carry the resource allocation information; or the EHT signal field includes a bitmap, and the bitmap is used to indicate a punctured bandwidth resource. When the value of the second field indicates no puncturing, the common field included in the EHT signal field in the PPDU may not exist.

For another example, the first field is a PPDU format field, and the second field is a bandwidth field. The bandwidth field is used to indicate whether a bandwidth is a bandwidth in a puncturing mode or a bandwidth in a non-puncturing mode.

For example, in 802.11ax, there are 3 bits for indicating a bandwidth. First four values indicate 20 M, contiguous 40 M, contiguous 80 M, and contiguous 160 M. Last four values indicate a punctured 80 M bandwidth and a punctured 160 M bandwidth. For example, in 802.11be, the bandwidth field may occupy 4 bits. In other words, a value of the bandwidth field is in [0, 15], that is, 16 values. First five values of the 16 values are used to indicate 20 M, contiguous 40 M, contiguous 80 M, contiguous 160 M, and contiguous 320 M. Optionally, one value may be included and used to indicate 240 M. Unused values of the 16 values respectively indicate punctured 40 M, punctured 80 M, punctured 160 M, and punctured 320 M. For example, a sixth value of the 16 values is used to indicate punctured 40 M, and a seventh value is used to indicate punctured 80 M. In this solution, if an 80 M single-user punctured PPDU is transmitted, the PPDU format field indicates the single-user PPDU, and the value of the bandwidth field is one of a plurality of values indicating punctured 80 M.

When the AP indicates each STA to send data, the AP needs to notify each STA of an RU allocated by the AP to each STA. Specifically, the AP may indicate, by using the bit sequence in Table 1, that is, the resource allocation information table, the RU allocated to each STA. One or more bit sequences indicate to divide a spectral bandwidth resource correspondingly into several resource block sets. One resource block set may include one or more resource blocks. A quantity of bit sequences depends on a bandwidth of the U-SIG field, and is equal to the bandwidth/20 MHz. Herein, the bandwidth is a multiple of 20 MHz. A non-divisible bandwidth is otherwise stated. One resource block set is allocated to one STA. The resource block includes attributes such as a size and a location. Each resource block set corresponds to one user information field or one group of user information fields. This is similar to a resource unit allocation field and one or more user information fields included in the HE-SIG B in 802.11ax. If one resource block set corresponds to one user information field, it indicates that the resource block set is allocated to the user for transmission. If one resource block set corresponds to one group of user information fields, it indicates that the resource block set is allocated to one group of users for transmission. It should be understood that, for one group of user information fields, for example, for a resource block that can be used for MU-MIMO transmission, a quantity of user information fields included in the group of user information fields is indicated by using the resource unit allocation field, for example, the letter x or y in the table. Details are similar to 802.11ax. Based on a correspondence between one or more resource block sets obtained through division performed on a bandwidth indicated by using one or more resource block allocation fields, and one or more subsequent user information fields, only after receiving the correspondence, the user can learn of a specific resource block set on which a downlink data of the user is transmitted.

In this embodiment of this application, the resource allocation information table in the 802.11ax standard may be used. In other words, the bit sequence in Table 1 indicates that one resource block set is allocated to one STA for transmission. The resource block set includes at least two resource units. It should be understood that the bit sequence used in this embodiment of this application may be a defined bit sequence, or may be an undefined bit sequence, that is, a reserved bit sequence, for example, "011101x1x0", "01111y2y1y0", "11011y2y1y0", or "111x4x3x2x1x0". In the following description, the following example is used: The bit sequence used in this embodiment of this application is the reserved bit sequence in Table 1, and the reserved bit sequence occupies m bits. In the following description, m is greater than or equal to 8.

The following separately describes the solutions provided in the embodiments of this application by using a single-user punctured transmission scenario and a full-bandwidth MU-MIMO punctured transmission scenario.

An embodiment of this application provides a single-user punctured transmission method. In this method, a plurality of reserved bit sequences are used to indicate that one resource block set is allocated to one user (STA), that is, transmission is implemented on a plurality of RUs; and may be further used to indicate a specific location at which a spectral bandwidth is punctured. One reserved bit sequence corresponds to one RU in one resource block set. Different reserved bit sequences indicate different types of allocated RUs. For example, a value of a reserved bit sequence is a first value, to indicate that one RU in the resource block set is a 242-tone RU; a value of a reserved bit sequence is a second value, to indicate that one RU in the resource block set is a 484-tone RU; a value of the reserved bit sequence is a third value, to indicate that one RU in the resource block set is a 996-tone RU; and so on. It should be understood that the 242-tone RU, the 484-tone RU, and the 996-tone RU may also be considered as different types of RUs.

In Table 1, "01110001" indicates "242-tone RU null (zero stations)—denoted as 242 (0)". In this embodiment of this application, a reserved bit sequence may be denoted as RU (same) in a similar manner. Herein, the "RU" indicates a type of RU, for example, the 242-tone RU or the 484-tone RU. A resource block carrying the "same" resource unit allocation field and another resource block carrying the "same" resource unit allocation field are allocated to one resource block set. In other words, the plurality of resource blocks are allocated to one user or one group of users. It should be noted that the resource block herein indicates a resource block greater than or equal to a 242-tone resource block. If it is indicated that one resource block set is allocated to one STA, a reserved bit sequence may be denoted as RU (same, 1). Herein, "1" indicates a quantity of STAs to which the resource block set is allocated for transmission. In the single-user punctured transmission scenario, there is only one STA. For example, the reserved bit sequence is "111x4x3x2x1x0" in Table 1. In this case, "11100000" may be denoted as 242 (same, 1), and "11100001" may be denoted as 484 (same, 1).

Figures 12, 13:
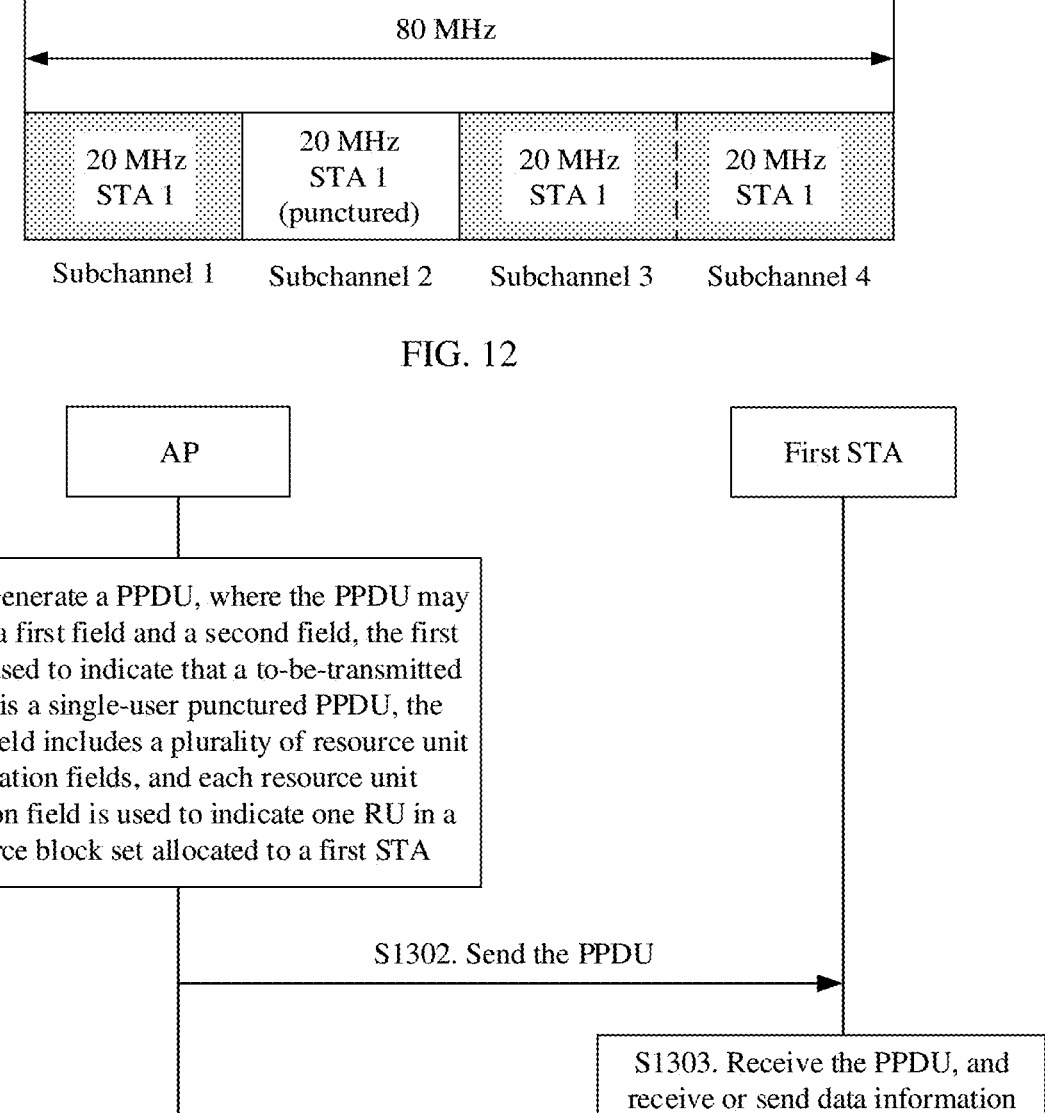
FIG. 12 is a schematic diagram of resource division for allocating an 80 MHz spectral bandwidth to one user according to an embodiment of this application.
FIG. 13 is a schematic flowchart of a single-user punctured transmission method according to an embodiment of this application.

For ease of understanding, with reference to FIG. 12, the following describes how the reserved bit sequence in Table 1 is used in this embodiment of this application to indicate that one resource block set is allocated to one STA (a STA 1 in FIG. 12) for transmission. FIG. 12 is a schematic diagram of allocating 80 MHz. For example, an 80 MHz bandwidth is divided into four subchannels, and each subchannel is 20 MHz or may be considered as a 242-tone RU. From left to right, numbers of the four subchannels are respectively 1 to 4, and the four subchannels are respectively denoted as an RU 1, an RU 2, an RU 3, and an RU 4.

It should be understood that, because the AP allocates an 80 MHz resource, the HE-SIG-B field in the PPDU includes the CC 1 and the CC 2, the CC 1 includes two resource unit allocation fields, and the CC 2 includes two resource unit allocation fields. Each of the four resource unit allocation fields carries one reserved bit sequence.

For example, a plurality of RUs allocated by the AP to the STA are inconsecutive. For example, the AP allocates the RU 1, the RU 3, and the RU 4 to the STA 1, that is, the RU 2 in the 80 MHz bandwidth is punctured. In other words, in this embodiment of this application, in the single-user transmission scenario, a noncontiguous bandwidth is supported, that is, some 20 MHz in the bandwidth is allowed to be punctured. In this case, the AP needs to indicate the punctured RU, in addition to the plurality of RUs used for transmission of the STA 1.

In a first example, the reserved bit sequence may be used to indicate a type of each RU included in the allocated resource block set and a total quantity of STAs to which the plurality of RUs are allocated for transmission. Resource allocation information included in a CC may be denoted as RU (same, 1). If the RU is punctured, the resource allocation information included in the CC is denoted as RU (0). For example, in Table 1, "01110001" indicates that the 242-tone RU is punctured and denoted as 242 (0).

For example, for the spectrum resource shown in FIG. 12, a CH 1, that is, a first 242-tone RU, may be indicated by using 242 (same, 1). Similarly, a second 242-tone RU may be indicated by using 242 (0), a third 242-tone RU may be indicated by using 242 (same, 1), and a fourth 242-tone RU may be indicated by using 242 (same, 1). Similarly, for the CC described in the 802.11ax standard, resource allocation information of an odd-numbered channel (that is, an m-bit sequence in the resource allocation table) is set on the CC 1, and resource allocation information of an even-numbered channel is set on the CC 2. In other words, 242 (same, 1) indicating first 20 M is set on the CC 1, 242 (0) indicating second 20 M is set on the CC 2, 242 (same, 1) indicating third 20 M is set on the CC 1, and 242 (same, 1) indicating fourth 20 M is set on the CC 2. In other words, the resource allocation information included in the CC 1 may be 242 (same, 1)+242 (same, 1), and the resource allocation information included in the CC 2 may be 242 (0)+242 (same, 1), to indicate that the RU 1, the RU 3, and the RU 4 are allocated to the STA 1, the RU 2 is punctured, and the RU 1, the RU 3, and the RU 4 are all 242-tone RUs.

For another example, the resource allocation information included in the CC 1 may be 242 (same, 1)+484 (same, 1), and the resource allocation information included in the CC 2 may be 242 (0)+484 (same, 1), to indicate that the RU 1, the RU 3, and the RU 4 are allocated to the STA 1, the RU 2 is punctured, the RU 1 is a 242-tone RU, and the RU 3 and the RU 4 are both 484-tone RUs. In this example, the RU 3 and the RU 4 are consecutive and are allocated to the STA 1 with a division granularity of 484 tones. This is different from the foregoing example. In this design, the STA 1 receives the CC 1 and the CC 2. All the allocated RUs can be obtained through interpreting only the CC 1 or the CC 2, instead of interpreting both the CC 1 and the CC 2.

It should be understood that, in the single-user punctured transmission scenario, a quantity of STAs to which the plurality of RUs are allocated for transmission is 1 by default. Therefore, the resource allocation information included in the CC 1 may be 242 (same)+242 (same), and the resource allocation information included in the CC 2 may be 242 (same)+242 (same). Similarly, the resource allocation information included in the CC 1 may be 484 (same)+484 (same), and the resource allocation information included in the CC 2 may be 484 (same)+484 (same).

In the single-user punctured transmission scenario, when sending the resource allocation information to the STA, the AP may indicate a receive address of a receive end. The receive address may carry an identifier of the STA, that is, an association identifier. Because the STA may determine based on the receive address whether the resource indication information is sent to the STA, in a possible design, the CC 1 and the CC 2 may not include the user information field corresponding to the resource unit allocation field, or the included user information field does not include the identifier of the STA.

Certainly, in another possible design, the CC 1 and the CC 2 may also include the user information fields corresponding to the respective resource unit allocation fields. For example, the CC 1 includes the user information field of the STA 1, and the CC 2 also includes the user information field of the STA 1. An identifier of the STA 1 may be carried in the user information field in the CC 1 and the user information field in the CC 2. For example, the resource allocation information included in the CC 1 may be 242 (same, 1)+242 (same, 1) and the user information field of the STA 1, and the resource allocation information included in the CC 2 may be 242 (0)+242 (same, 1) and the user information field of the STA 1. In this design manner, although the AP does not add the identifier of the STA to the specified receive address when sending the resource allocation information, the STA may still determine, through reading the user information fields in the CC 1 and the CC 2, the RU allocated by the AP to the STA.

In an alternative implementation of the first example, in a second example, the reserved bit sequence may be used to indicate a type of each RU included in the allocated resource block set and a quantity of user information fields. Resource allocation information included in a CC is denoted as RU (same, k). Herein, k is used to indicate the quantity of user information fields. It should be understood that, for example, a value of the reserved bit sequence is a fourth value to indicate that one RU in the resource block set is a 242-tone RU and a corresponding quantity of user information fields is a specific value; a value of the reserved bit sequence is a fifth value to indicate that one RU in the resource block set is a 484-tone RU and a quantity of corresponding user information fields is a specific value; and so on. It should be understood that, for example, a value of the reserved bit sequence is a fourth value to indicate that one RU in the resource block set is a 242-tone RU and a corresponding quantity of user information fields is a specific value, for example, 1. It should be understood that, for example, a value of the reserved bit sequence is a fifth value to indicate that one RU in the resource block set is a 242-tone RU and a quantity of corresponding user information fields is a specific value, for example, 2. A value of the received bit sequence is a twelfth value to indicate that one RU in the resource block set is a 484-tone RU and a corresponding quantity of user information fields is a specific value, for example, 1; and so one.

For example, in correspondence with the spectral bandwidth shown in FIG. 12, the resource allocation information included in the CC 1 may be 242 (same, 1)+242 (same, 0) and the user information field of the STA 1, and the resource allocation information included in the CC 2 may be 242 (0)+242 (same, 1) and the user information field of the STA 1, to indicate that the RU 1, the RU 3, and the RU 4 are allocated to the STA 1. The RU 2 is punctured. The RU 1, the RU 3, and the RU 4 are all 242-tone RUs. A quantity of user information fields corresponding to the RU 1 is 1. A quantity of user information fields corresponding to the RU 2 is 0. A quantity of user information fields corresponding to the RU 3 is 0. A quantity of user information fields corresponding to the RU 4 is 1. Alternatively, the resource allocation information included in the CC 1 may be 242 (same, 0)+242 (same, 1) and the user information field of the STA 1, and the resource allocation information included in the CC 2 may be 242 (o)+242 (same, 1) and the user information field of the STA 1, to indicate that the RU 1, the RU 3, and the RU 4 are allocated to the STA 1. The RU 2 is punctured. The RU 1, the RU 3, and the RU 4 are all 242-tone RUs. A quantity of user information fields corresponding to the RU 1 is 0. A quantity of user information fields corresponding to the RU 2 is 1. A quantity of user information fields corresponding to the RU 3 is 0. A quantity of user information fields corresponding to the RU 4 is 1.

Alternatively, the resource allocation information included in the CC 1 may be 242 (same, 1)+484 (same, 0) and the user information field of the STA 1, and the resource allocation information included in the CC 2 may be 242 (0)+484 (same, 1) and the user information field of the STA 1, to indicate that the RU 1, the RU 3, and the RU 4 are allocated to the STA 1. The RU 2 is punctured. The RU 1 is a 242-tone RU. The RU 3 and the RU 4 form a 484-tone RU. A quantity of user information fields set on the CC 1 and corresponding to the RU 1 is 1. A quantity of user information fields set on the CC 2 and corresponding to the RU 2 is 0. A quantity of user information fields set on the CC 1 and corresponding to the RU 3 is 0. A quantity of user information fields set on the CC 2 and corresponding to the RU 4 is 1. The user field may carry the identifier of the STA 1, or may not carry the identifier of the STA 1.

It should be understood that this embodiment of this application does not limit a specific user information field carrying the identifier of the STA 1, provided that the STA 1 can obtain the identifier of the STA 1 from the CC 1 and the CC 2.

It should be noted that, that the AP allocates the 80 MHz bandwidth is used as only an example in the foregoing embodiment. It should be understood that this embodiment of this application is also applicable to another bandwidth, for example, 40 MHz, 160 MHz, and even a 320 MHz bandwidth supported in the next-generation protocol 802.11be obtained through evolution based on the current 802.11ax protocol. A difference is a different quantity of pieces of resource allocation information included in the CC 1. For example, for 160 MHz, the resource allocation information included in the CC 1 may be 242 (same, 1)+242 (same, 1)+242 (same, 1)+242 (same, 1), and the resource allocation information included in the CC 2 may be 242 (same, 1)+242 (same, 1)+242 (same, 1)+242 (same, 1); and so on. Details are not described herein.

It should be noted that if one or more fields in a preamble indicate the single-user punctured transmission, 242 (1) in the table may be reused as a variant of 242 (same, 1), to indicate that an RU corresponding to a 242 (1) bit sequence is allocated to one STA. Similarly, a variant of 484 (same, 1)

may also be denoted as 484 (1). Alternatively, 484 (1) in the table may be reused to indicate that an RU corresponding to a 484 (1) bit sequence is allocated to one STA. Similarly, the following is further included: 996 (1) in Table 1 is used to is replace 996 (same, 1), and newly added 996*2 (1) is used to replace 996*2 (same, 1).

FIG. 13 shows a downlink single-user punctured transmission method according to an embodiment of this application. The method may include the following steps:

S1301. An AP generates a PPDU. A preamble of the PPDU may include a first field and a second field. The first field is used to indicate that a to-be-transmitted PPDU is a single-user punctured PPDU. The second field includes a plurality of resource unit allocation fields. Each resource unit allocation field is used to indicate one RU in a resource block set allocated to a first STA.

S1302. The AP sends the PPDU to the first STA.

S1303. The first STA receives the PPDU, and receives or sends data information based on the allocated resource block set.

It should be understood that the first field may be located in the foregoing U-SIG field. The first field includes one or more subfields used to carry the foregoing first indication information. For a specific manner of adding the first indication information to the U-SIG field, refer to the description in the foregoing embodiment. Details are not described herein again. The second field may be the common field in the foregoing EHT-SIG field. The second field includes a plurality of resource unit allocation fields. Each resource unit allocation field may carry the foregoing reserved bit sequence used to indicate one RU in the resource block set allocated to the first STA. Certainly, a puncturing location is also indicated by using a reserved bit sequence. For a specific implementation, refer to the foregoing embodiment in the single-user punctured transmission scenario. Details are not described herein again.

An embodiment of this application further provides a full-bandwidth MU-MIMO punctured transmission method. In this method, a plurality of reserved bit sequences are used to indicate that one resource block set (that is, a plurality of RUs) is allocated to one group of stations (a plurality of STAs) for MIMO transmission; and may be further used to indicate a specific location at which a frequency bandwidth is punctured. One reserved bit sequence corresponds to one RU in one resource block set. It should be understood that this group of STAs may be STAs performing full-bandwidth MU-MIMO transmission. Similarly, in this scenario, one m-bit sequence in the resource allocation information table indicates one RU. The RU is one RU in a resource block set allocated to n STAs, and is used by the n users to perform MU-MIMO transmission. For example, one m-bit sequence in the resource allocation information table indicates a 242-tone RU, and the 242-tone RU is allocated to four STAs for MU-MIMO transmission performed by the four STAs. For brevity, the m-bit sequence is denoted as 242 (same, 4). To be specific, the m-bit sequence indicates one 242-tone RU. The 242-tone RU is one RU in a resource block set allocated to the four STAs for the MU-MIMO transmission performed by the four STAs.

Figure 14:
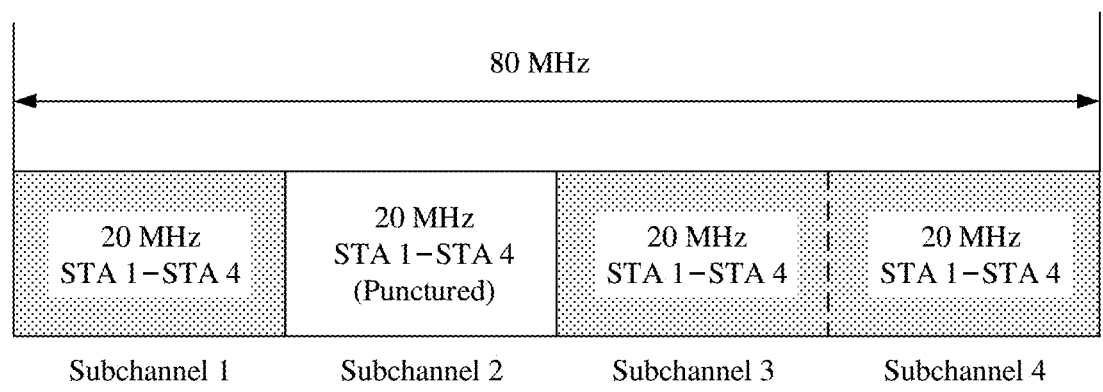
FIG. 14 is a schematic diagram of resource division for allocating an 80 MHz spectral bandwidth to four users according to an embodiment of this application.

With reference to FIG. 14, the following describes how the reserved bit sequence in Table 1 is used in an embodiment of this application to indicate that a plurality of RUs are allocated to one group of STAs for MIMO transmission FIG. 14 is a schematic diagram of allocating 80 MHz. For example, an 80 MHz bandwidth is divided into four subchannels, and each subchannel is 20 MHz or may be considered as a 242-tone RU. From left to right, numbers of the four subchannels are respectively 1 to 4, and the four subchannels are respectively denoted as an RU 1, an RU 2, an RU 3, and an RU 4. FIG. 14 shows an example in which an AP indicates that a plurality of RUs are allocated to one group of STAs (a STA 1 to a STA 4) for MIMO transmission. It should be understood that a quantity of the plurality of STAs is not limited in this embodiment of this application.

Specifically, in a first example, the reserved bit sequence may be used to indicate a type of each RU included in the allocated resource block set and a total quantity of STAs to which the resource block set is allocated for transmission. Resource allocation information included in a CC is denoted as RU (same, n). Herein, n represents the total quantity of STAs to which the resource block set is allocated for transmission. If the RU is punctured, the resource allocation information included in the CC is denoted as RU (o). For example, in Table 1, "01110001" indicates that the 242-tone RU is punctured and denoted as (o).

For example, the resource allocation information included in the CC 1 may be 242 (same, 4)+242 (same, 4), and the resource allocation information included in the CC 2 may be 242 (0)+242 (same, 4), to indicate that three inconsecutive RUs (the RU 1, the RU 3, and the RU 4) are allocated to the four STAs for transmission, the RU 2 is punctured, and the RU 1, the RU 3, and the RU 4 are all 242-tone RUs.

It should be understood that, in a possible design, each CC includes user information fields of two STAs. For example, the resource allocation information included in the CC 1 may be 242 (same, 4)+242 (same, 4), a user information field of the STA 1, and a user information field of the STA 2; and the resource allocation information included in the CC 2 may be 242 (0)+242 (same, 4), a user information field of the STA 3, and a user information field of the STA 4.

For another example, the resource allocation information included in the CC 1 may be 242 (same, 4)+484 (same, 4), and the resource allocation information included in the CC 2 may be 242 (0)+484 (same, 4), to indicate that three inconsecutive RUs (the RU 1, the RU 3, and the RU 4) are allocated to the four STAs for transmission, the RU 2 is punctured, the RU 1 is a 242-tone RU, and the RU 3 and the RU 4 form a 484-tone RU. In this example, the RU 3 and the RU 4 are consecutive and are allocated to the STA 1 with a division granularity of 484 tones. This is different from the foregoing example. In this design, the STA 1 receives the CC 1 and the CC 2. The allocated RUs can be obtained through interpreting only the CC 1 or the CC 2 to form a greater resource block, instead of interpreting both the CC 1 and the CC 2.

In an alternative implementation of the first example, in a second example, the reserved bit sequence may be used to indicate a type of each RU included in the allocated resource block set and a quantity of user information fields. Resource allocation information included in a CC is denoted as RU (same, k). Herein, k is the quantity of user information fields.

For example, the resource allocation information included in the CC 1 may 242 (same, 1)+242 (same, 1), and the resource allocation information included in the CC 2 may be 242 (0)+242 (same, 2), to indicate that three inconsecutive RUs (the RU 1, the RU 3, and the RU 4) are allocated to the four STAs for transmission. The RU 2 is punctured. The RU 1, the RU 3, and the RU 4 are all 242-tone RUs. A quantity of user information fields set on the CC 1 and corresponding to the RU 1 is 1. A quantity of user information fields set on the CC 2 and corresponding to the RU 2 is 1. A quantity of user information fields set on the CC 1 and corresponding to the RU 3 is 0. A quantity of user information fields set on the CC 2 and corresponding to the RU 4 is 2.

Alternatively, the resource allocation information included in the CC 1 may be 242 (same, 2)+484 (same, 0), and the resource allocation information included in the CC 2 may be 242 (0)+484 (same, 2), to indicate that three inconsecutive RUs (the RU 1, the RU 3, and the RU 4) are allocated to the four STAs for transmission. The RU 2 is punctured. The RU 1 is a 242-tone RU. The RU 3 and the RU 4 form a 484-tone RU. A quantity of user information fields set on the CC 1 and corresponding to the RU 1 is 2. A quantity of user information fields set on the CC 2 and corresponding to the RU 2 is 0. A quantity of user information fields set on the CC 1 and corresponding to the RU 3 is 0. A quantity of user information fields set on the CC 2 and corresponding to the RU 4 is 2.

It should be understood that, in a possible design, each CC includes user information fields of two STAs. For example, the CC 1 and the CC 2 include user information fields of a STA 1 and a STA 2, and the CC 2 also includes user information fields of a STA 3 and a STA 4.

In an alternative implementation of the first example and the second example, the reserved bit sequence may be used to indicate a type of each RU included in the allocated resource block set including 242 (same), 484 (same), 996 (same), and 996*2 (same). Herein, n or k does not need to be added. In other words, for the first example, the total quantity of STAs to which a plurality of RUs are allocated for transmission may be indicated by using other signaling; and for the second example, the total quantity of user information fields of the two CCs is the total quantity of STAs to which the plurality of RUs are allocated for transmission. For example, the AP indicates, by using second indication information, the total quantity of STAs to which the plurality of RUs are allocated for transmission, or the quantity of user information fields. For an implementation of the second indication information, refer to an implementation of the first indication information in the foregoing embodiment. Details are not described herein.

In a possible design, the second indication information may be carried in the first field of the PPDU. The first field may be located in front of the common field of the EHT-SIG field in the PPDU, for example, may be the U-SIG field or another possible field. For example, the U-SIG field occupies a plurality of bits. Some of the plurality of bits are used to indicate the total quantity n of STAs in allocation or the quantity k of user information fields.

It should be understood that if the AP can support, for example, communication with 16 STAs at the same time, that is, a value range of n may be [1,16], and there are at least four types of RUs, the reserved bit sequence shown in Table 1 obviously cannot indicate all cases. Therefore, in this embodiment of this application, a used bit sequence may occupy more than 8 bits, for example, 9 bits. For example, the reserved bit sequence in Table 1 is used, and the reserved bit sequence occupies 9 bits, to implement that the AP allocates a plurality of RUs to the 16 STAs by using the reserved bit sequence. In other words, m in this embodiment of this application is greater than or equal to 8.

In another alternative implementation, if the first indication information in this embodiment of this application is used to indicate the full-bandwidth MU-MIMO punctured transmission scenario, other indication information in this embodiment of this application may be further used to indicate that one resource block set is allocated to a plurality of STAs for transmission, and indicate a location at which a spectral bandwidth is punctured. The indication information may be carried in, for example, the common field of the EHT field in the PPDU. For example, a field may be newly defined in the common field to indicate a bandwidth puncturing bitmap. For example, for an 80 MHz bandwidth, the field may occupy 4 bits. In other words, in this embodiment of this application, a 4-bit bandwidth puncturing bitmap may be used to indicate specific punctured 20 MHz. For example, a value "1011" of the field may indicate that second 20 MHz is punctured, and "1111" may indicate that 80 MHz is not punctured. Alternatively, for example, for a 320 MHz bandwidth, the field may occupy 15 bits or 16 bits. Alternatively, a quantity of bits occupied by the field is fixed, that is, the quantity does not change with a bandwidth. For example, the quantity of bits occupied by the field is a quantity of 20 M included in a maximum bandwidth, for example, 16 bits. The field can be used to implement allocating a plurality of RUs to a plurality of STAs, and also support allocation of a plurality of inconsecutive RUs.

It should be understood that the bandwidth puncturing bitmap may also be replaced with an available channel bitmap to indicate whether a plurality of 20 MHz from a low frequency to a high frequency are idle in the bandwidth. For example, a first value, for example, 1 is set for the available channel bitmap, to indicate that corresponding 20 MHz is idle; and a second value, for example, 0 is set for the available channel bitmap, to indicate that corresponding 20 MHz is busy. In addition, the available channel bitmap may also indicate whether a plurality of 20 MHz from a high frequency to a low frequency are idle in the bandwidth.

It should be noted that if the AP indicates the single-user punctured transmission by using one or more fields in the preamble, 242 (1) in Table 1 may be reused as a variant of 242 (same, 1), to indicate that an RU corresponding to a 242 (1) bit sequence is allocated to one STA. Similarly, 484 (1) in Table 1 may be reused as a variant of 484 (same, 1) to indicate that an RU corresponding to a 242 (1) bit sequence is allocated to one STA. Similarly, 996 (1) in Table 1 is reused to replace 996 (same, 1), and newly added 996*2 (1) is reused to replace 996*2 (same, 1).

Figure 15:
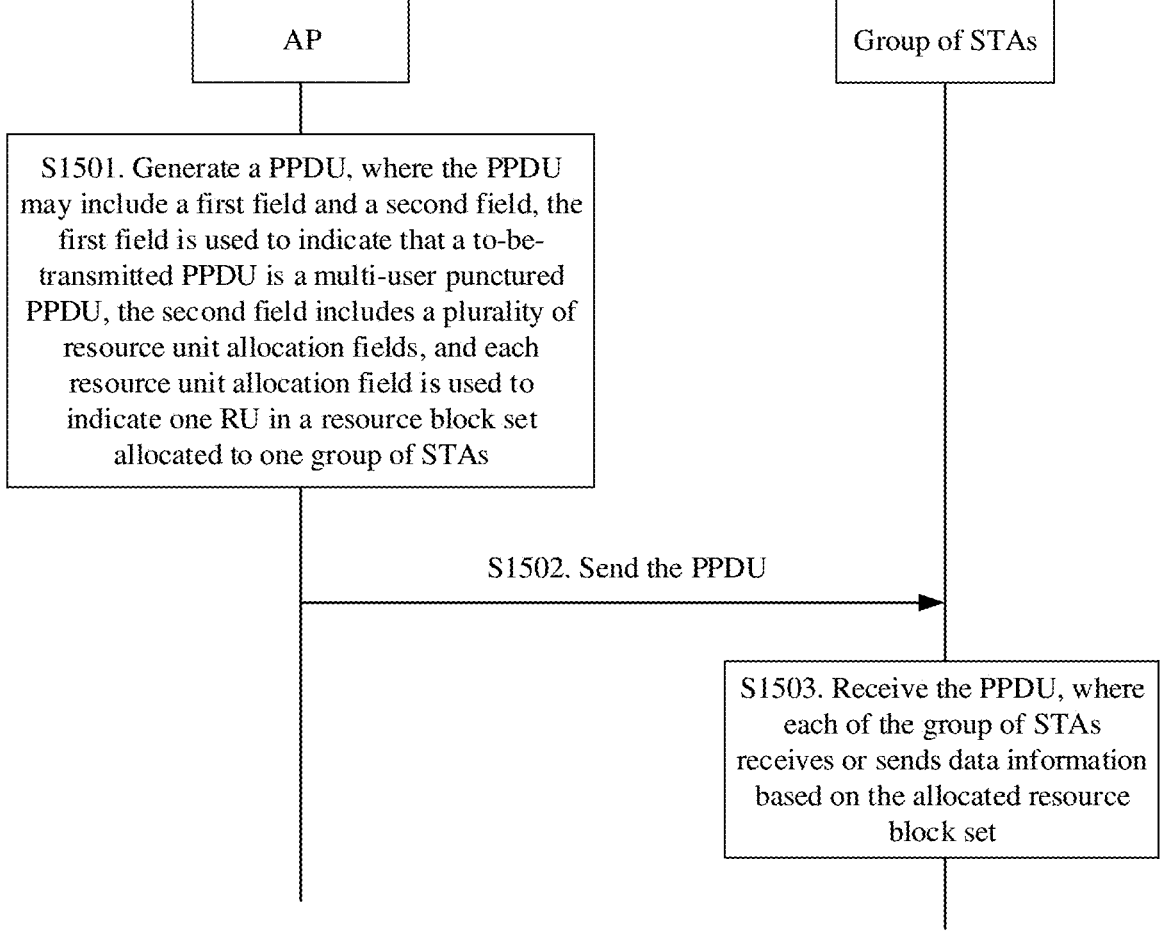
FIG. 15 is a schematic flowchart of a full-bandwidth MU-MIMO punctured transmission method according to an embodiment of this application.

FIG. 15 shows a downlink full-bandwidth MU-MIMO punctured transmission method according to an embodiment of this application. The method may include the following steps:

S1501. An AP generates a PPDU. A preamble of the PPDU may include a first field and a second field. The first field is used to indicate that a to-be-transmitted PPDU is a single-user punctured PPDU. The second field includes a plurality of resource unit allocation fields. Each resource unit allocation field is used to indicate one RU in a resource block set allocated to one group of STAs.

S1502. The AP sends the PPDU.

S1503. The group of STAs receives the PPDU. Each of the group of STAs receives or sends data information based on the allocated resource block set.

It should be understood that the first field may be the foregoing U-SIG field used to carry the first indication information. For a specific manner of adding the first indication information to the U-SIG field, refer to the description in the foregoing embodiment. Details are not described herein again. Alternatively, when this embodiment of this application is specifically applied in a downlink full-bandwidth MU-MIMO punctured transmission scenario, the PPDU may be generated when the AP needs to perform downlink full-bandwidth MU-MIMO transmission. The preamble of the PPDU indicates that the group of users performs downlink full-bandwidth MU-MIMO punctured transmission. This is similar to a single-user punctured transmission scenario. A specific method is as follows: One value in a PPDU format field of the U-SIG field indicates multi-user transmission, and one or more values in a puncturing field or a bandwidth field indicate punctured transmission. A punctured transmission method indicated by the bandwidth field is similar to 802.11ax. Some values of the bandwidth field indicate a punctured bandwidth. For example, a fifth value indicates 80 M in a puncturing manner 1, and a sixth value indicates an 80 M bandwidth in a puncturing manner 2. One of the two values may indicate puncturing.

The U-SIG field further includes a compression field. When the compression field is set to a first value, for example, 1, it indicates that the resource unit allocation field of the common field of the EHT SIG field or the bandwidth puncturing bitmap/available channel bitmap does not exist. When the compression field is set to the first value and the indication information indicates non-puncturing, in this case, a subfield that is located in the U-SIG field or another field and that is similar to a "number of HE-SIG-B symbols or multi-user multiple-input multiple-output stations" in the HE-SIG A indicates a quantity of multi-user multiple-input multiple-output stations.

When the compression field is set to a second value, for example, 0, it indicates that the resource unit allocation field of the common field of the EHT SIG field or the bandwidth puncturing bitmap/available channel bitmap exists. When the compression field is set to the second value and the indication information indicates non-puncturing, in this case, a subfield that is located in the U-SIG field or another field and that is similar to a "number of HE-SIG-B symbols or multi-user multiple-input multiple-output stations" in the HE-SIG A in Table 2 indicates a quantity of OFDM symbols in the EHT-SIG field. When the compression field is set to the second value and the indication information indicates puncturing, in this case, a subfield that is located in the U-SIG field or another field and that is similar to a "number of HE-SIG-B symbols or multi-user multiple-input multiple-output stations" in the HE-SIG A indicates a quantity of multi-user multiple-input multiple-output stations.

The second field may be the common field in the foregoing EHT-SIG field. The second field includes a plurality of resource unit allocation fields. Each resource unit allocation field may carry the foregoing reserved bit sequence used to indicate one RU in the resource block set allocated to the group of STAs. Certainly, a puncturing location is also indicated by using a reserved bit sequence. For a specific implementation, refer to the foregoing embodiment in a single-user punctured transmission scenario. Details are not described herein again.

In a possible application scenario, for example, a downlink OFDMA PPDU transmission scenario, in this embodiment of this application, the reserved bit sequence in the resource allocation information table may be used to indicate that a plurality of RUs greater than or equal to a 242-tone RU are allocated to a single station or a group of stations for data transmission. For the group of stations, the group of stations performs MU-MIMO transmission on the plurality of RUs greater than or equal to the 242-tone RU.

Figure 16:
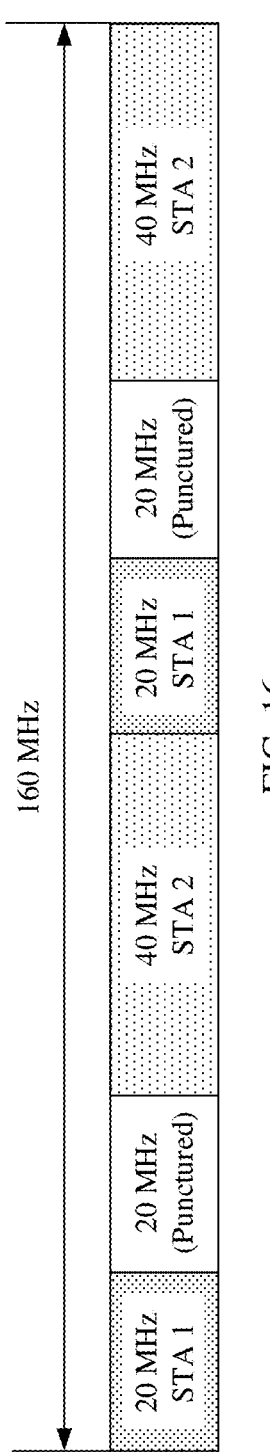
FIG. 16 is a schematic diagram of overlapping between resource units allocated to different users according to an embodiment of this application.

It should be noted that with reference to FIG. 16, it is assumed in an embodiment of this application that overlapping is not allowed between frequency bands included in the plurality of RUs allocated to different stations. FIG. 16 is a schematic diagram of allocating 160 MHz. In FIG. 16, for example, a 160 MHz bandwidth is divided into eight subchannels, and each subchannel is a 242-tone RU. From left to right, numbers of the eight subchannels are respectively a CH 1 to a CH 8, and the eight subchannels are respectively denoted as an RU 1, an RU 2, an RU 3, an RU 4, an RU 5, an RU 6, an RU 7, and an RU 8. The RU 2 and the RU 6 are punctured. Overlapping is not allowed between frequency band ranges of the plurality of RUs allocated to different stations. To be specific, as shown in FIG. 14, the resource is allocated to the two stations. The RU 1, the RU 3, and the RU 4 may be allocated to one station; and the RU 5, the RU 7, and the RU 8 may be allocated to the other station. However, it is not allowed to allocate the RU 1 and the RU 5 to one station, and allocate the RU 3, the RU 4, the RU 7, and the RU 8 to the other station. It may be understood that this embodiment of this application may also be used in a case in which overlapping exists between frequency bands

TABLE 2

| HE-SIG A field | | | |
| --- | --- | --- | --- |
| HE-SIG-A symbol | Bit | Field | Bit quantity |
| HE-SIGA1 | B0 | Uplink/Downlink | 1 |
| | B1-B3 | HE-SIG-B modulation and coding | 3 |
| | B4 | HE-SIG-B dual carrier modulation | 1 |
| | B5-B10 | BSS (basic service set) color | 6 |
| | B11-B14 | Spatial reuse | 4 |
| | B15-B17 | Bandwidth | 3 |
| | B18-B21 | Number of HE-SIG-B symbols or multi-user multiple-input multiple-output stations | 4 |
| | B22 | HE-SIG-B compression | 1 |
| | B23-B24 | Guard interval + long training field size | 2 |
| | B25 | Doppler | 1 |
| HE-SIGA 2 | B0-B6 | Transmission opportunity | 7 |
| | B7 | Reserved | 1 |
| | B8-B10 | Number of HE-LTF symbols and midamble periodicity | 3 |
| | B11 | Low-density parity-check extra symbol segment | 1 |
| | B12 | Space time block code | 1 |
| | B13-B14 | Pre-forward error correction padding factor | 2 |
| | B15 | Padding extension disambiguity | 1 |
| | B16-B19 | Cyclic redundancy code | 4 |
| | B20-B25 | Tail | 6 | included in the plurality of RUs allocated to the stations. In this case, modes of allocating a plurality of RUs to the same station are limited but not random.

In this embodiment of this application, because overlapping is not allowed between the plurality of RUs allocated to different stations, in this embodiment of this application, a final allocated RU may be indicated to the STA, to indicate specific RUs that are allocated to the same STA in the plurality of allocated RUs. In other words, in this embodiment of this application, the following may be indicated: An allocated RU is a final RU belonging to a plurality of RUs allocated to a STA. Alternatively, it may be considered that a final RU in a plurality of RUs allocated to a STA may be used as an identifier for distinguishing between RUs allocated to different STAs. In other words, the final RU belongs to a final RU of a previous STA, but a first RU following the final RU is allocated to a current STA.

In a possible implementation, in addition to the type of each RU in the allocated resource block set, the reserved bit sequence may further indicate third indication information and a total quantity of stations to which a plurality of RUs greater than or equal to a 242-tone RU are allocated for transmission. The third indication information is used to indicate the final RU in the plurality of RUs allocated to the STA.

The third indication information may include first identification information and second identification information. Changes of the first identification information and the second identification information may indicate the final RU of the previous STA. In other words, the changes of the first identification information and the second identification information indicate a frequency boundary of RUs allocated to different STAs. For example, resource allocation information included in one resource unit allocation subfield may be denoted as RU (same, A, n). Herein, an "RU" indicates a type of RU, for example, a 242-tone RU or a 484-tone RU; "same" means that reserved bit sequences carried in resource unit allocation subfields are the same; "A" indicates the first identification information; and "n" indicates the total quantity of stations to which a plurality of RUs greater than or equal to a 242-tone RU are allocated for transmission. It should be understood that if "A" indicates the final RU in the plurality of RUs of the first STA, the second identification information "B" may be used to indicate the final RU in the plurality of RUs of the second STA. In other words, resource allocation information included in one resource unit allocation field in a CC may be denoted as RU (same, B, n). It should be noted that in RU (x, y, z), RU represents a size, x represents same, y represents A or B, and z represents n. Herein, RU (x, y, z) needs to be indicated by using one reserved bit sequence as long as one parameter is different.

In an alternative implementation, in addition to the type of the allocated RU, the reserved bit sequence may further indicate third indication information and a total quantity of user information fields of stations to which a plurality of RUs greater than or equal to a 242-tone RU are allocated for transmission. For example, resource allocation information included in one resource unit allocation subfield may be denoted as RU (same, A, k) or RU (same, B, k). Herein, k is a quantity of user information fields. This is similar to the foregoing embodiment.

Figure 17:
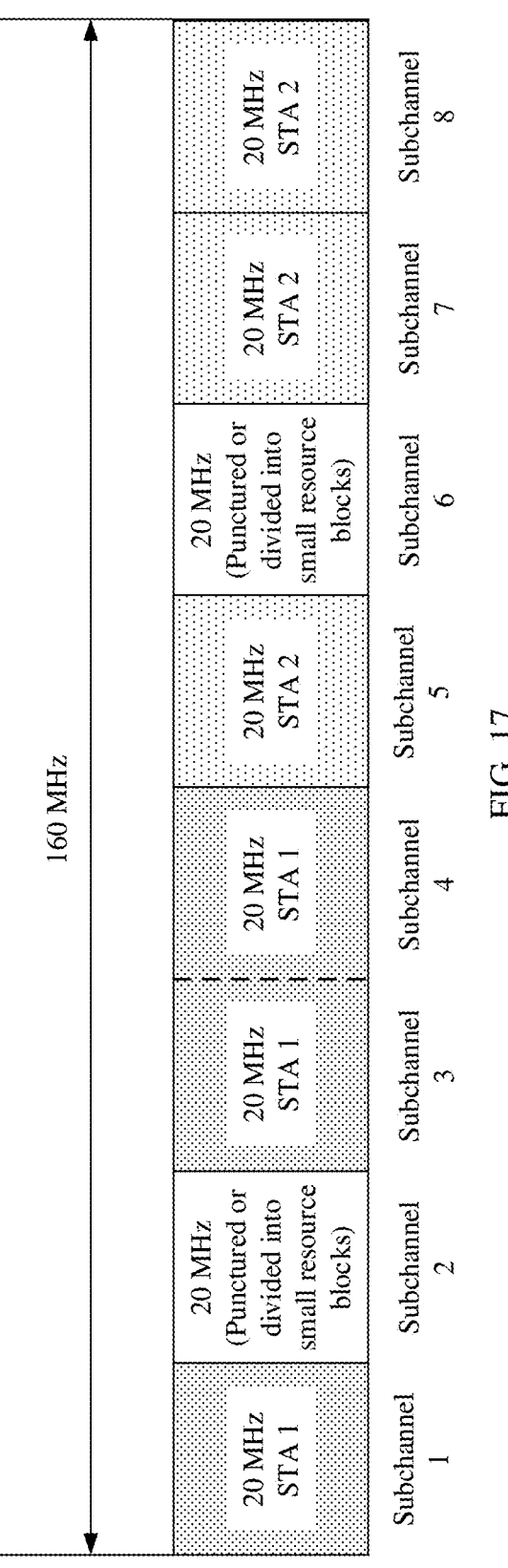
FIG. 17 is a schematic diagram of resource division for allocating a 160 MHz spectral bandwidth to two users according to an embodiment of this application.
Figure 18:
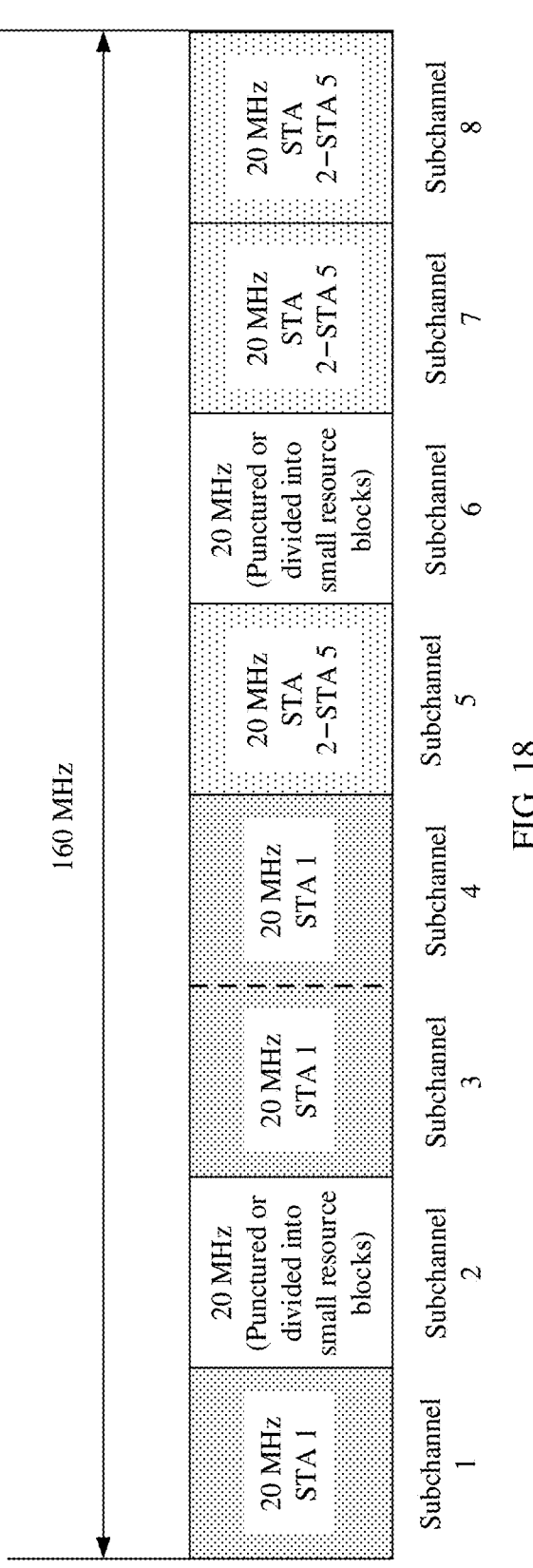
FIG. 18 is a schematic diagram of resource division for allocating a 160 MHz spectral bandwidth to five users according to an embodiment of this application.

For ease of understanding, with reference to FIG. 17 and FIG. 18, the following describes how an AP indicates that one or more STAs to which a plurality of RUs greater than or equal to a 242-tone RU are allocated for data transmission.

FIG. 17 is a schematic diagram of allocating 160 MHz. For example, a 160 MHz bandwidth is divided into eight subchannels, and each subchannel is a 242-tone RU. From left to right, numbers of the eight subchannels are respectively a CH 1 to a CH 8, and the eight subchannels are respectively denoted as an RU 1, an RU 2, an RU 3, an RU 4, an RU 5, an RU 6, an RU 7, and an RU 8. The RU 2 and the RU 6 are divided into a plurality of small resource blocks. It is assumed that the AP allocates the RU 1, the RU 3, and the RU 4 to a STA 1, and allocates the RU 5, the RU 7, and the RU 8 to a STA 2. The STA 1 and the STA 2 perform single-user transmission on the 160 MHz bandwidth. The RU 2 and the RU 6 may be allocated to another STA.

In a first example, the reserved bit sequence may be used to indicate a type of each RU included in the allocated resource block set, third indication information, and a total quantity of STAs to which a plurality of RUs greater than or equal to a 242-tone RU are allocated for transmission. Resource allocation information included in a CC may be denoted as RU (same, A or B, 1).

For example, the resource allocation information included in the CC 1 may be 242 (same, A, 1)+242 (same, A, 1)+242 (same, B, 1)+242 (same, B, 1), and the resource allocation information included in the CC 2 may be X+242 (same, A, 1)+Y+242 (same, B, 1), to indicate that RUs corresponding to the same bit sequence are allocated to the same STA. Changes of A and B indicate a specific RU that is a final RU in the plurality of RUs of the STA 1. Because the total quantity of STAs to which the plurality of RUs greater than or equal to the 242-tone RU are allocated for transmission is 1, the CC 1 may include one user information field of the STA 1 and one user information field of the STA 2, and the CC 2 may include one user information field of the STA 1 and one user information field of the STA 2. Herein, X and Y separately indicate the plurality of small resource blocks obtained through dividing 20 MHz. This may be specifically indicated by using the 802.11ax standard, that is, indicated by using the currently defined bit sequence in Table 1.

Alternatively, the resource allocation information included in the CC 1 may be 242 (same, A, 1)+484 (same, A, 1)+242 (same, B, 1)+484 (same, B, 1), and the resource allocation information included in the CC 2 may be X+484 (same, A, 1)+Y+484 (same, B, 1), to indicate that RUs corresponding to the same bit sequence are allocated to the same STA. Changes of A and B indicate a specific RU that is a final RU in the plurality of RUs of the STA 1. It should be understood that the CC 1 may include one user information field of the STA 1 and one user information field of the STA 2, and the CC 2 may include one user information field of the STA 1 and one user information field of the STA 2. Herein, X and Y separately indicate the plurality of small resource blocks obtained through dividing 20 MHz. This may be specifically indicated by using the 802.11ax standard, that is, indicated by using the currently defined bit sequence in Table 1.

In an alternative implementation of the first example, the reserved bit sequence may be used to indicate a type of an allocated RU, third indication information, and a total quantity of user information fields of STAs to which a plurality of RUs greater than or equal to a 242-tone RU are allocated for transmission. Resource allocation information included in a CC may be denoted as RU (same, A or B, k). It should be understood that a value of k is 0 or 1. Herein, RU (same, A or B, 0) may further indicate that a quantity of user information fields corresponding to the resource bit sequence included in the CC is 0, and RU (same, A or B, 1)

may further indicate that a quantity of user information fields corresponding to the resource bit sequence included in the CC is 1.

In this case, the resource allocation information included in the CC 1 may be 242 (same, A, 1)+242 (same, A, 0)+242 (same, B, 0)+242 (same, B, 0), and the resource allocation information included in the CC 2 may be X+242 (same, A, 0)+Y+242 (same, B, 1), to indicate that RUs corresponding to the same bit sequence are allocated to the same STA. Changes of A and B indicate a specific RU that is a final RU in the plurality of RUs of the STA 1. In this case, the CC 1 may include a user information field of the STA 1, and the CC 2 may include a user information field of the STA 2. Herein, X and Y separately indicate the plurality of small resource blocks obtained through dividing 20 MHz. This may be specifically indicated by using the 802.11ax standard, that is, indicated by using the currently defined bit sequence in Table 1.

Alternatively, the resource allocation information included in the CC 1 may be 242 (same, A, 1)+484 (same, A, 0)+242 (same, B, 0)+484 (same, B, 0), and the resource allocation information included in the CC 2 may be X+484 (same, A, 0)+Y+484 (same, B, 1). It should be understood that the CC 1 may include a user information field of the STA 1, and the CC 2 may include a user information field of the STA 2. Herein, X and Y separately indicate the plurality of small resource blocks obtained through dividing 20 MHz. This may be specifically indicated by using the 802.11ax standard, that is, indicated by using the currently defined bit sequence in Table 1.

FIG. 18 is a schematic diagram of allocating 160 MHz. For example, a 160 MHz bandwidth is divided into eight subchannels, and each subchannel is a 242-tone RU. From left to right, numbers of the eight subchannels are respectively a CH 1 to a CH 8, and the eight subchannels are respectively denoted as an RU 1, an RU 2, an RU 3, an RU 4, an RU 5, an RU 6, an RU 7, and an RU 8. The RU 2 and the RU 6 are divided into a plurality of small resource blocks. It is assumed that the AP allocates the RU 1, the RU 3, and the RU 4 to a STA 1, and allocates the RU 5, the RU 7, and the RU 8 to four STAs: a STA 2, a STA 3, a STA 4, and a STA 5. The STA 1 to the STA 4 perform full-bandwidth MU-MIMO transmission on the 160 MHz bandwidth.

In a first example, the reserved bit sequence may be used to indicate a type of each RU included in an allocated resource block set, third indication information, and a total quantity of STAs to which a plurality of RUs greater than or equal to a 242-tone RU are allocated for transmission. In this case, resource allocation information included in a CC may be denoted as RU (same, A or B, n).

For example, the resource allocation information included in the CC 1 may be 242 (same, A, 1)+242 (same, A, 1)+242 (same, B, 4)+242 (same, B, 4), and the resource allocation information included in the CC 2 may be X+242 (same, A, 0)+Y+242 (same, B, 0), to indicate that RUs corresponding to the same bit sequence are allocated to the same STA. Changes of A and B indicate a specific RU that is a final RU in the plurality of RUs of the STA 1. In this case, the CC 1 includes user information fields of the STA 1 to the STA 5, and the CC 2 includes user information fields corresponding to the CH 2 and the CH 6. Herein, X and Y separately indicate the plurality of small resource blocks obtained through dividing 20 MHz. This may be specifically indicated by using the currently defined bit sequence in Table 1.

Alternatively, the resource allocation information included in the CC 1 may be 242 (same, A, 1)+484 (same, A, 1)+242 (same, B, 4)+484 (same, B, 4), and the resource allocation information included in the CC 2 may be X+484 (same, A, 0)+Y+484 (same, B, 0), to indicate that RUs corresponding to the same bit sequence are allocated to the same STA. Changes of A and B indicate a specific RU that is a final RU in the plurality of RUs of the STA 1. In this case, the CC 1 includes user information fields of the STA 1 to the STA 5, and the CC 2 includes user information fields corresponding to the CH 2 and the CH 6. Herein, X and Y separately indicate the plurality of small resource blocks obtained through dividing 20 MHz. This may be specifically indicated by using the 802.11ax standard, that is, indicated by using the currently defined bit sequence in Table 1.

In an alternative implementation of the first example, the reserved bit sequence may be used to indicate a type of each RU included in an allocated resource block set, third indication information, and a total quantity of user information fields of STAs to which a plurality of RUs greater than or equal to a 242-tone RU are allocated for transmission. Resource allocation information included in a CC may be denoted as RU (same, A or B, k). It should be understood that a value of k is 0-5. For example, RU (same, A or B, 0) may further indicate that a quantity of user information fields corresponding to the resource bit sequence included in the CC is 0, and RU (same, A or B, 1) may further indicate that a quantity of user information fields corresponding to the resource bit sequence included in the CC is 1.

In this case, the resource allocation information included in the CC 1 may be 242 (same, A, 1)+242 (same, A, 0)+242 (same, B, 0)+242 (same, B, 0), and the resource allocation information included in the CC 2 may be X+242 (same, A, 0)+Y+242 (same, B, 0), to indicate that RUs corresponding to the same bit sequence are allocated to the same STA. Changes of A and B indicate a specific RU that is a final RU in the plurality of RUs of the STA 1. In this case, the CC 1 includes user information fields of the STA 1 to the STA 5, and the CC 2 includes user information fields corresponding to the CH 2 and the CH 6. Herein, X and Y separately indicate the plurality of small resource blocks obtained through dividing 20 MHz. This may be specifically indicated by using the 802.11ax standard, that is, indicated by using the currently defined bit sequence in Table 1.

Alternatively, the resource allocation information included in the CC 1 may be 242 (same, A, 1)+484 (same, A, 0)+242 (same, B, 0)+484 (same, B, 5), and the resource allocation information included in the CC 2 may be X+484 (same, A, 0)+Y+484 (same, B, 1). It should be understood that the CC 1 includes user information fields of the STA 1 to the STA 5, and the CC 2 includes user information fields corresponding to the CH 2 and the CH 6. Herein, X and Y separately indicate the plurality of small resource blocks obtained through dividing 20 MHz. This may be specifically indicated by using the 802.11ax standard, that is, indicated by using the currently defined bit sequence in Table 1.

An embodiment of this application further provides an information indication method used for uplink data transmission of a STA. In an uplink multi-user data transmission scenario, when a plurality of STAs need to simultaneously send uplink data information, an AP first sends a trigger frame to each STA participating in the multi-user data transmission, to indicate an RU allocated to each STA in the trigger frame. Then, after receiving the trigger frame, each STA sends, as a response, an uplink OFDMA frame, or a MU-MIMO frame, or a hybrid frame of OFDMA and MU-MIMO. Afterwards, the AP may send an acknowledgment frame based on the received uplink OFDMA frame, or the received MU-MIMO frame, or the received hybrid frame of OFDMA and MU-MIMO, to trigger each STA to transmit uplink data information on the RU allocated by the AP.

Figure 19:
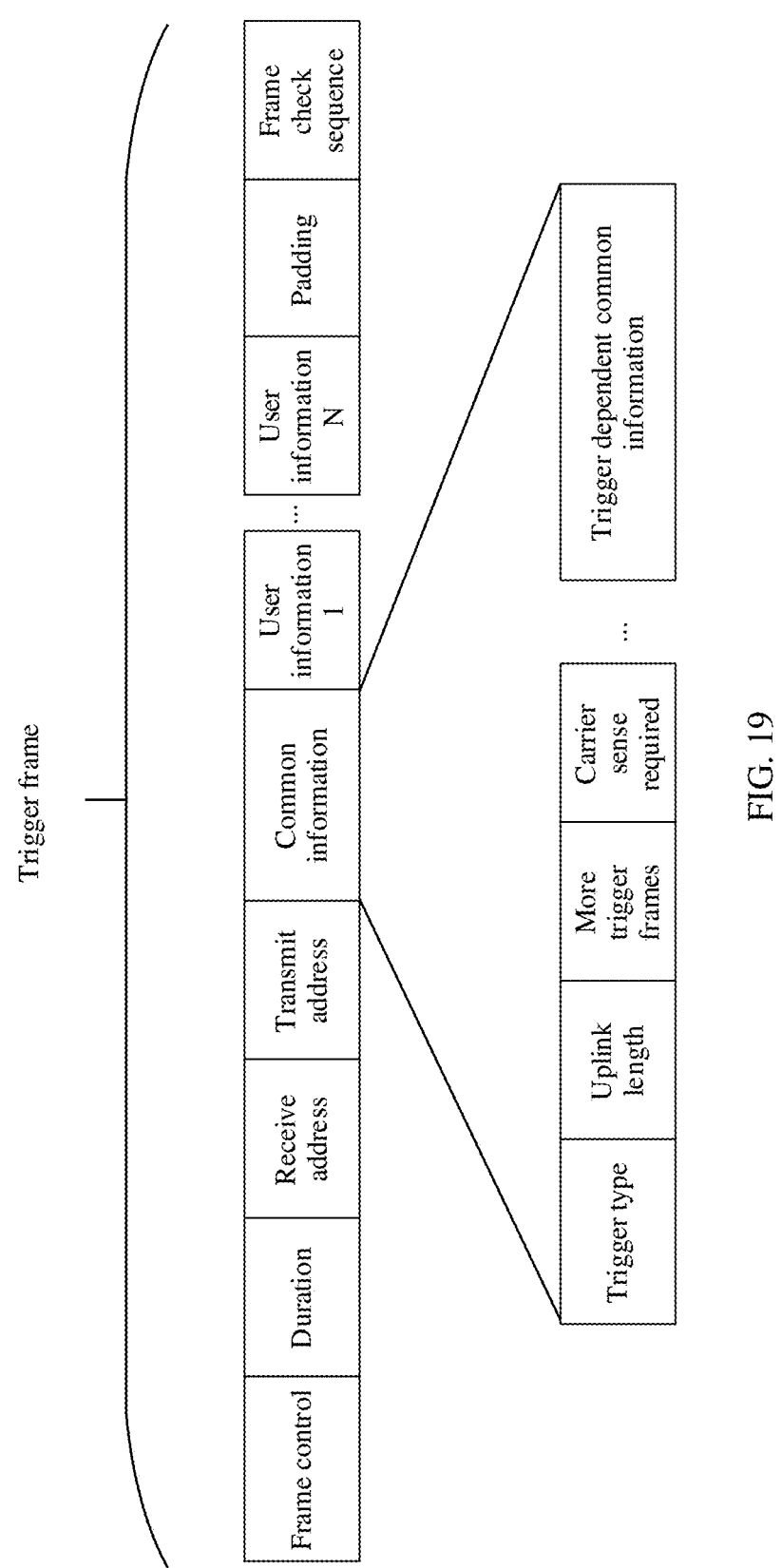
FIG. 19 is a schematic diagram of a frame structure of a trigger frame according to an embodiment of this application.

A structure of the trigger frame is shown in FIG. 19. The structure includes a frame control field, a duration field, a receive address field, a transmit address field, a common information field, a user information list field, a padding field, and a frame check sequence field. The common information field and the user information list field are similar to the common field in an HE-SIG B and the plurality of user information fields in the foregoing downlink multi-user transmission. For example, the common information field includes a trigger type field, an uplink length field, a more trigger frames field, a carrier sense required field, a bandwidth field, and a common information field based on a trigger frame type.

As shown in FIG. 20, the user information field may include an association identifier field, a resource unit allocation field, an uplink coding type field, an uplink modulation and coding scheme field, an uplink dual-carrier modulation field, a spatial stream allocation or random access resource unit information field, an uplink received signal strength indication field, a reserved field, and a user information list field based on a trigger frame type.

In this embodiment of this application, a plurality of STAs are allowed to perform full-bandwidth multi-user MU-MIMO transmission on a noncontiguous bandwidth. In this case, if an uplink trigger frame scheduling method in 802.11ax is still used, a quantity of user information fields of all users that need to repeatedly participate in MU-MIMO transmission on several inconsecutive RUs increases with relatively high signaling overheads. FIG. 12 is used as an example. In the uplink full-bandwidth multi-user MU-MIMO punctured transmission scenario, the trigger frame needs to include user information fields of the STA 1 to the STA 4 in transmission on 20 M (the RU 1) and 40 M (the RU 3 and the RU 4, corresponding to a 484-tone resource block). Eight user information fields in total need to be included.

In view of this, an embodiment of this application provides a new structure of a trigger frame used for uplink multi-user MU-MIMO punctured transmission, to avoid repeated sending of information of a MU-MIMO user group corresponding to a plurality of inconsecutive resource blocks due to a punctured bandwidth, thereby reducing signaling overheads.

In a possible design, a new type may be added to the trigger type field of the trigger frame, that is, uplink full-bandwidth multi-user MU-MIMO punctured transmission.

For example, the trigger type field shown in FIG. 19 may also indicate the uplink full-bandwidth multi-user MU-MIMO punctured transmission. It should be understood that the trigger type field includes a plurality of bits. One value in the trigger type field is used to indicate that the trigger frame is used to trigger the uplink full-bandwidth multi-user MU-MIMO punctured transmission.

In another possible design, a field may be added to the common information field of the trigger frame, to indicate uplink full-bandwidth multi-user MU-MIMO punctured transmission.

For example, a field is newly defined in the common information field of the trigger frame shown in FIG. 19, for example, a first field. The first field may occupy one or more bits. A value of the first field is a first value (for example, 1), to indicate the uplink full-bandwidth multi-user MU-MIMO punctured transmission. A value of the first field is a second value (for example, 0), to indicate no uplink full-bandwidth multi-user MU-MIMO punctured transmission.

In addition, the resource unit allocation field in the user information field in the trigger frame shown in FIG. 20 may be replaced with a bandwidth puncturing bitmap field. In other words, the resource unit allocation field is used to indicate whether each 20 MHz from a low frequency to a high frequency in a bandwidth is punctured, or whether each 20 MHz from a low frequency to a high frequency in a bandwidth except a primary 20 MHz channel is punctured. For example, for an 80 MHz bandwidth, the resource unit allocation field may occupy 4 bits. In other words, in this embodiment of this application, a 4-bit bandwidth puncturing bitmap may be used to indicate specific punctured 20 MHz. For example, a value "1011" of the field may indicate that second 20 MHz is punctured, and "1111" may indicate that 80 MHz is not punctured. Alternatively, for example, for a 320 MHz bandwidth, the resource unit allocation field may occupy 15 bits (each 20 MHz except primary 20 MHz) or 16 bits (each 20 MHz). Alternatively, a quantity of bits occupied by the resource unit allocation field is fixed, that is, the quantity does not change with a bandwidth. For example, the quantity of bits occupied by the resource unit allocation field is a quantity of 20 M included in a maximum bandwidth, for example, 16 bits. The resource unit allocation field can be used to implement allocating a plurality of RUs to one or more STAs, and also support allocation of a plurality of inconsecutive RUs.

In another possible implementation, a bandwidth puncturing bitmap field is replaced with an available channel bitmap to indicate specific available 20 MHz from a low frequency to a high frequency in a bandwidth, or specific available 20 MHz from a low frequency to a high frequency in a bandwidth except a primary 20 MHz channel.

Figures 21, 22:
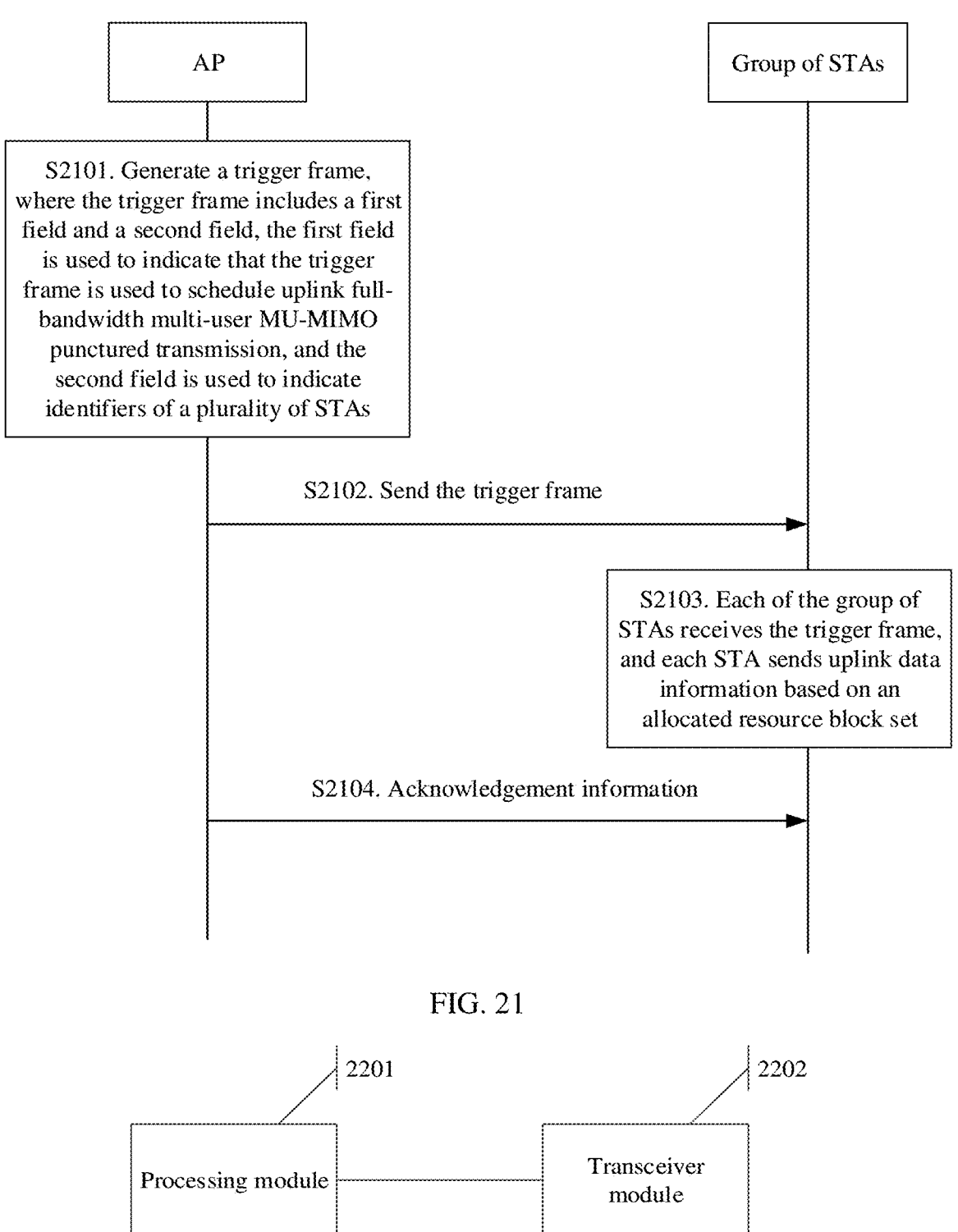
FIG. 21 is a schematic flowchart of an uplink full-bandwidth MU-MIMO punctured transmission method according to an embodiment of this application.
FIG. 22 is a schematic diagram of a structure of an AP according to an embodiment of this application.

FIG. 21 shows an uplink full-bandwidth multi-user MU-MIMO punctured transmission method according to an embodiment of this application. The method may include the following steps:

S2101. An AP generates a trigger frame. The trigger frame includes a first field and a second field. The first field is used to indicate that the trigger frame is used to schedule uplink full-bandwidth multi-user MU-MIMO punctured transmission. The second field is used to indicate identifiers of a plurality of STAs.

S2102. The AP sends the trigger frame.

S2133. Each of a group of STAs receives the trigger frame. Each STA sends uplink data information based on an allocated resource block set.

S2134. The AP receives information about uplink multi-user transmission sent by one or more STAs, and feeds back acknowledgement information.

The first field may be a common information field of the trigger frame. The second field may be a user information field. For a specific implementation, refer to the descriptions in the foregoing embodiments. It should be understood that the common information field of the trigger frame further includes one or more of an uplink length field, a more trigger frames field, a carrier sense required field, and a bandwidth field; a bandwidth puncturing bitmap field or an available channel bitmap; and the like. The common information field further includes one or more of an uplink coding type field, an uplink modulation and coding scheme field, an uplink dual-carrier modulation field, a spatial stream allocation or random access resource unit information field, and an uplink received signal strength indication field.

It should be understood that, in step S2134, each STA sends the uplink multi-user transmission after a fixed interval. The fixed interval is a SIFS time. The uplink multi-user transmission is uplink MU-MIMO transmission. In step S2134, the acknowledgement information may be a downlink OFDMA acknowledgement, or a multi-user block acknowledgement.

In the foregoing solution in this application, the bit sequence in the resource allocation information table may be used to indicate a resource block set allocated to one STA, or a resource block set allocated to a plurality of STAs. One bit sequence corresponds to one RU in the resource block set.

In the foregoing embodiments of this application, the method provided in the embodiments of this application is described separately from perspectives of an AP, a STA, and interaction between an AP and a STA. To implement functions in the methods provided in the embodiments of this application, a network device and a terminal may include a hardware structure and/or a software module, to implement the functions in a form of a hardware structure, a software module, or a combination of a hardware structure and a software module. Whether a function in the functions is performed in a manner of a hardware structure, a software module, or a combination of a hardware structure and a software module depends on particular applications and design constraint conditions of the technical solution.

A communications apparatus for implementing the foregoing methods in the embodiments of this application is described below with reference to the accompanying drawings. Therefore, the foregoing content may be all used in a subsequent embodiment. Repeated content is not described again.

FIG. 22 is a schematic diagram of a structure of a communications apparatus. The communications apparatus may be an apparatus applied to an AP side, or may be a component (for example, a chip or a circuit) in an apparatus applied to an AP side. The communications apparatus is configured to implement a function implemented by the AP in the foregoing method embodiments. As shown in FIG. 22, the communications apparatus may include a processing module 2201 and a transceiver module 2202.

In some embodiments, the processing module 2201 is configured to determine resource indication information. The resource indication information includes a plurality of bit sequences. A first bit sequence in the plurality of bit sequences corresponds to a first resource unit. The first resource unit is a resource unit in a resource block set that is allocated to a first STA or a plurality of STAs. The resource block set includes at least two resource units.

The transceiver module 2202 is configured to send the resource indication information.

In some other embodiments, the processing module 2201 is configured to generate first indication information. The first indication information is used to indicate that a plurality of STAs perform full-bandwidth multi-user MU-MIMO transmission on a noncontiguous bandwidth.

The transceiver module 2202 is configured to send the first indication information.

It should be understood that the communications apparatus is the AP in the foregoing methods, and the communications apparatus has any function of the AP in the foregoing methods.

The foregoing describes the communications apparatus in this embodiment of this application. The following describes a possible product form of the communications apparatus. It should be understood that any product in any form having the function of the communications apparatus described in FIG. 22 falls within the protection scope of the embodiments of this application. It should be further understood that the following description is merely an example and does not indicate that the product form of the communications apparatus in this embodiment of this application is limited thereto.

In a possible product form, the communications apparatus in this embodiment of this application may be implemented by using a general bus system structure.

The communications apparatus includes a processor and a transceiver internally connected to and communicating with the processor. In some embodiments, the processor is configured to determine resource indication information. The resource indication information includes a plurality of bit sequences. A first bit sequence in the plurality of bit sequences corresponds to a first resource unit. The first resource unit is a resource unit in a resource block set that is allocated to a first STA or a plurality of STAs. The resource block set includes at least two resource units. The transceiver is configured to send the resource indication information. Optionally, the communications apparatus may further include a memory. The memory is configured to store instructions to be executed by the processor.

In another embodiment, the processor is configured to generate first indication information. The first indication information is used to indicate that a plurality of STAs perform full-bandwidth multi-user MU-MIMO transmission on a noncontiguous bandwidth. The transceiver is configured to send the first indication information. Optionally, the communications apparatus may further include a memory. The memory is configured to store instructions to be executed by the processor.

In a possible product form, the communications apparatus in this embodiment of this application may be implemented by using a general-purpose processor.

The general-purpose processor for implementing the communications apparatus includes a processing circuit and an output interface internally connected to and communicating with the processing circuit. The processing circuit is configured to determine resource indication information. The resource indication information includes a plurality of bit sequences. A first bit sequence in the plurality of bit sequences corresponds to a first resource unit. The first resource unit is a resource unit in a resource block set that is allocated to a first STA or a plurality of STAs. The resource block set includes at least two resource units. The output interface is configured to send the resource indication information. Optionally, the general-purpose processor may further include a storage medium. The storage medium is configured to store instructions to be executed by the processing circuit.

The general-purpose processor for implementing the communications apparatus includes a processing circuit and an input interface internally connected to and communicating with the processing circuit. The processing circuit is configured to generate first indication information. The first indication information is used to indicate a plurality of STAs perform full-bandwidth multi-user MU-MIMO transmission on a noncontiguous bandwidth. The input interface is configured to send the first indication information. Optionally, the general-purpose processor may further include a storage medium. The storage medium is configured to store instructions to be executed by the processing circuit.

In a possible product form, the communications apparatus in this embodiment of this application may be further implemented by using the following: one or more FPGAs (field programmable gate array), a PLD (programmable logic device), a controller, a state machine, gate logic, a discrete hardware component, any other proper circuit, or any combination of circuits that can execute the functions described in this application.

It should be understood that the communications apparatuses in the foregoing various product forms have any function of the AP in the method embodiments. Details are not described herein again.

In short, in the prior art, a punctured channel is not allowed to be used during single-user transmission and full-bandwidth multi-user MU-MIMO transmission. This application is a technical solution proposed for allowing using a punctured channel during single-user transmission and full-bandwidth multi-user MU-MIMO transmission. Specifically, the embodiments of this application provide the single-user punctured transmission method and the full-bandwidth MU-MIMO punctured transmission method. The following separately describes related solutions for implementing the two methods.

It should be noted that, in the following, m≥8, for example, m=8 or m=9; n=one of 1 to 16; and a punctured 242-tone RU (that is, 20 M) may be indicated by using an m-bit sequence. For brief description, "242 (0)" is used to mark the m-bit sequence. In other words, it may be considered that "242 (0)" represents an m-bit sequence. The m-bit sequence indicates a null 242-tone RU, or indicates a punctured 242-tone RU.

(1) Solutions Related to the Single-User Punctured Transmission Method

Embodiment 1: One or more fields in a U-SIG field are used to indicate whether a to-be-transmitted PPDU is a single-user punctured PPDU.

Embodiment 2: How to indicate a specific puncturing location during single-user punctured transmission?

Specific solution 1:

An m-bit sequence in a resource allocation table indicates an RU. The RU is one of a plurality of RUs allocated to a user. Herein, m≥8.

For example, the m-bit sequence in the resource allocation table indicates a 242-tone RU. The 242-tone RU is one of a plurality of RUs allocated to the user. For brief description, "242 (same, 1)" is used to mark the m-bit sequence. In other words, it may be considered that "242 (same, 1)" represents the m-bit sequence. The m-bit sequence indicates the 242-tone RU. The 242-tone RU is one of the plurality of RUs allocated to the user.

Therefore, for the puncturing shown in FIG. 12, a first 242-tone RU (that is, 20 M) is indicated by using 242 (same, 1), a second 242-tone RU is indicated by using 242 (o), a third 242-tone RU is indicated by using 242 (same, 1), and a fourth 242-tone RU is indicated by using 242 (same, 1). For the CC described in the 802.11ax standard, resource allocation information of an odd-numbered channel (that is, an m-bit sequence in the resource allocation table) is set on a CC 1, and resource allocation information of an even-numbered channel is set on a CC 2. In this case, 242 (same, 1) indicating the first 20 M is set on the CC 1, 242 (0) indicating the second 20 M is set on the CC 2, 242 (same, 1) indicating the third 20 M is set on the CC 1, and 242 (same, 1) indicating the fourth 20 M is set on the CC 2. Information carried in the CC 1 and the CC 2 respectively includes: for the CC 1, 242 (same, 1) and 242 (same, 1); and for the CC 2, 242 (0) and 242 (same, 1).

Optionally, the CC 1 and the CC 2 further separately include one user information field, and information carried in the CC 1 and the CC 2 respectively includes: for the CC 1, 242 (same, 1), 242 (same, 1), and a user information field of a STA 1; and for the CC 2, 242 (0), 242 (same, 1), and the user information field of the STA 1.

It should be understood that the m-bit sequence may further indicate an RU with another size. For example, an m-bit sequence in the resource allocation table indicates a 484-tone RU. The 484-tone RU is one of a plurality of RUs allocated to a user. For brief description, "484 (same, 1)" is used to mark the m-bit sequence. In other words, it may be considered that "484 (same, 1)" represents the m-bit sequence. The m-bit sequence indicates the 484-tone RU. The 484-tone RU is one of the plurality of RUs allocated to the user. For the puncturing shown in FIG. 12, information carried in the CC 1 and the CC 2 may further respectively include: for the CC 1, 242 (same, 1) and 484 (same, 1); and for the CC 2, 242 (0) and 484 (same, 1).

Optionally, the CC 1 and the CC 2 further separately include one user information field, and information carried in the CC 1 and the CC 2 respectively includes: for the CC 1, 242 (same, 1), 484 (same, 1), and a user information field of a STA 1; and for the CC 2, 242 (0), 484 (same, 1), and the user information field of the STA 1.

It should be further understood that the m-bit sequence may further indicate an RU with another size. For example, an m-bit sequence in the resource allocation table indicates a 996 RU, and the 996 RU is one of a plurality of RUs allocated to a user. For example, an m-bit sequence in the resource allocation table indicates a 2*996 RU, and the 2*996 RU is one of a plurality of RUs allocated to a user. This optional solution is similar to the foregoing solution. Details are not described herein.

Specific solution 2:

An m-bit sequence in a resource allocation table indicates an RU. The RU is one of a plurality of RUs allocated to a user. A quantity of user information fields corresponding to the RU is 0. Another m-bit sequence in the resource allocation table indicates an RU. The RU is one of a plurality of RUs allocated to a user. A quantity of user information fields corresponding to the RU is 1. Herein, m≥3.

For example, an m-bit sequence in the resource allocation table indicates a 242-tone RU. The 242-tone RU is one of a plurality of RUs allocated to a user. A quantity of user information fields corresponding to the 242-tone RU is 0. For brief description, "242 (same, 0)" is used to mark the m-bit sequence. In other words, it may be considered that "242 (same, 0)" represents the m-bit sequence, the m-bit sequence indicates the 242-tone RU, the 242-tone RU is one of the plurality of RUs allocated to the user, and the quantity of user information fields corresponding to the 242-tone RU is 0. Another m-bit sequence in the resource allocation table indicates a 242-tone RU. The 242-tone RU is one of a plurality of RUs allocated to a user. A quantity of user information fields corresponding to the 242-tone RU is 1. For brief description, "242 (same, 1)" is used to mark the m-bit sequence. In other words, it may be considered that "242 (same, 1)" represents the m-bit sequence, the m-bit sequence indicates the 242-tone RU, the 242-tone RU is one RU of the plurality of RUs allocated to the user, and the quantity of user information fields corresponding to the 242-tone RU is 1.

If a CC 1 and a CC 2 separately include one user information field, in the single-user puncturing shown in FIG. 12, information carried in the CC 1 and the CC 2 includes one of the following:

(1) for the CC 1, 242 (same, 1), 242 (same, 0), and a user information field of a STA 1; and for the CC 2, 242 (0), 242 (same, 1), and the user information field of the STA 1; or (2) for the CC 1, 242 (same, 0), 242 (same, 1), and a user information field of a STA 1; and for the CC 2, 242 (0), 242 (same, 1), and the user information field of the STA 1.

It should be understood that an m-bit sequence may further indicate an RU with another size. For example, an m-bit sequence in the resource allocation table indicates a 484-tone RU. The 484-tone RU is one of a plurality of RUs allocated to a user. A quantity of user information fields corresponding to the 484-tone RU is 0. For brief description, "484 (same, 0)" is used to mark the m-bit sequence. In other words, it may be considered that "484 (same, 0)" represents the m-bit sequence, the m-bit sequence indicates the 484-tone RU, the 484-tone RU is one of the plurality of RUs allocated to the user, and the quantity of user information fields corresponding to the 484-tone RU is 0. For another example, an m-bit sequence in the resource allocation table indicates a 484-tone RU. The 484-tone RU is one of a plurality of RUs allocated to a user. A quantity of user information fields corresponding to the 484-tone RU is 1. For brief description, "484 (same, 1)" is used to mark the m-bit sequence. In other words, it may be considered that "484 (same, 1)" represents the m-bit sequence, the m-bit sequence indicates the 484-tone RU, the 484-tone RU is one of the plurality of RUs allocated to the user, and the quantity of user information fields corresponding to the 484-tone RU is 1.

If a CC 1 and a CC 2 separately include one user information field, in the single-user puncturing shown in FIG. 12, information carried in the CC 1 and the CC 2 may further be any one of the following:

(1) for the CC 1, 242 (same, 1), 484 (same, 0), and a user information field of a STA 1; and for the CC 2, 242 (0), 484 (same, 1), and the user information field of the STA 1; or (2) for the CC 1, 242 (same, 0), 484 (same, 1), and a user information field of a STA 1; and for the CC 2, 242 (0), 484 (same, 1), and the user information field of the STA 1.

It should be further understood that an m-bit sequence may further indicate an RU with another size. For example, an m-bit sequence in the resource allocation table indicates a 996 RU, the 996 RU is one of a plurality of RUs allocated to a user, and a quantity of user information fields corresponding to the 996 RU is 0. For another example, an m-bit sequence in the resource allocation table indicates a 996 RU, the 996 RU is one of a plurality of RUs allocated to a user, and a quantity of user information fields corresponding to the 996 RU is 1. For another example, an m-bit sequence in the resource allocation table indicates a 2*996 RU, the 2*996 RU is one of a plurality of RUs allocated to a user, and a quantity of user information fields corresponding to the 2*996 RU is 0. For another example, an m-bit sequence in the resource allocation table indicates a 2*996 RU, the 2*996 RU is one of a plurality of RUs allocated to a user, and a quantity of user information fields corresponding to the 996 RU is 1.

(2) Solutions Related to the Downlink Full-Bandwidth MU-MIMO Punctured Transmission Method Embodiment 1: One or more fields in a U-SIG field are used to indicate whether a to-be-transmitted PPDU is a PPDU in full-bandwidth MU-MIMO punctured transmission.

Embodiment 2: How to indicate a specific puncturing location during the full-bandwidth MU-MIMO transmission?

The full-bandwidth MU-MIMO punctured transmission shown in FIG. 14 may be implemented by using a plurality of solutions in the following.

Specific solution 1:

An m-bit sequence in a resource allocation table indicates an RU. The RU is one of a plurality of RUs that are allocated to n users for MU-MIMO performed by the n users. Herein, $m \geq 8$, and n=one of 1 to 16. An m-bit sequence in a resource allocation table indicates a 242-tone RU. The 242-tone RU is one of a plurality of RUs that are allocated to four users for MU-MIMO performed by the four users. For brief description, "242 (same, 4)" is used to mark the m-bit sequence. In other words, it may be considered that "242 (same, 4)" represents the m-bit sequence. The m-bit sequence indicates the 242-tone RU. The 242-tone RU is one of the plurality of RUs that are allocated to the four users for MU-MIMO performed by the four users.

Therefore, for the full-bandwidth MU-MIMO punctured transmission shown in FIG. 14, first 20 M is indicated by using 242 (same, 4), second 20 M is indicated by using 242 (o), third 20 M is indicated by using 242 (same, 4), and fourth 20 M is indicated by using 242 (same, 4). In a method for setting resource allocation information (that is, the m-bit sequence in the resource allocation table) of an odd-numbered channel and an even-numbered channel, information carried in a CC 1 and a CC 2 respectively includes: for the CC 1, 242 (same, 4) and 242 (same, 4); and for the CC 2, 242 (0) and 242 (same, 4).

Optionally, if each CC includes two user information fields, for example, information carried in the CC 1 and the CC 2 respectively includes: for the CC 1, 242 (same, 4), 242 (same, 4), a user information field of a STA 1, and a user information field of a STA 2; and for the CC 2, 242 (0), 242 (same, 4), a user information field of a STA 3, and a user information field of a STA 4.

It should be understood that the m-bit sequence may further indicate an RU with another size. For example, an m-bit sequence in the resource allocation table indicates a 484-tone RU. The 484-tone RU is one of a plurality of RUs that are allocated to four users for MU-MIMO performed by the four users. For brief description, "484 (same, 4)" is used to mark the m-bit sequence. In other words, it may be considered that "484 (same, 4)" represents the m-bit sequence. The m-bit sequence indicates the 484-tone RU. The 484-tone RU is one of the plurality of RUs that are allocated to the four users for MU-MIMO performed by the four users. In this case, information carried in the CC 1 and the CC 2 may further respectively include: for the CC 1, 242 (same, 4) and 484 (same, 4); and for the CC 2, 242 (0) and 484 (same, 4).

Optionally, if each CC includes two user information fields, information carried in the CC 1 and the CC 2 respectively includes: for the CC 1, 242 (same, 4), 484 (same, 4), a user information field of a STA 1, and a user information field of a STA 2; and for the CC 2, 242 (0), 484 (same, 4), a user information field of a STA 3, and a user information field of a STA 4.

It should be further understood that the m-bit sequence may further indicate an RU with another size. For example, an m-bit sequence in the resource allocation table indicates a 996 RU, and the 996 RU is one of a plurality of RUs that are allocated to four users for MU-MIMO performed by the four users. For example, an m-bit sequence in the resource allocation table indicates a 2*996 RU, and the 2*996 RU is one of a plurality of RUs that are allocated to four users for MU-MIMO performed by the four users. This optional solution is similar to the foregoing solution. Details are not described herein.

Certainly, the m-bit sequence may indicate one of a plurality of RUs that are allocated to the n users for MU-MIMO performed by the n users. Herein, n=any one of 1 to 16. An example in which n=$_4$ is merely used as an example. A specific value of n is not limited in this embodiment of this application.

Specific solution 2:

An m-bit sequence in a resource allocation table indicates an RU. The RU is one of a plurality of RUs that are allocated to n users for MU-MIMO performed by the n users. The RU corresponds to k user information fields. For example, an m-bit sequence in the resource allocation table indicates a 242-tone RU, the 242-tone RU is one of a plurality of RUs that are allocated to four users for MU-MIMO performed by the four users, and the 242-tone RU corresponds to one user information field. For brief description, "242 (same, 1)" is used to mark the m-bit sequence. In other words, it may be considered that "242 (same, 1)" represents the m-bit sequence. The m-bit sequence indicates the 242-tone RU. The 242-tone RU is one of the plurality of RUs that are allocated to the four users for MU-MIMO performed by the four users. The 242-tone RU corresponds to one user information field.

Therefore, for the full-bandwidth MU-MIMO punctured transmission shown in FIG. 14, first 20 M is indicated by using 242 (same, 1), second 20 M is indicated by using 242 (o), third 20 M is indicated by using 242 (same, 1), and fourth 20 M is indicated by using 242 (same, 2). In a method for setting resource allocation information (that is, the m-bit sequence in the resource allocation table) of an odd-numbered channel and an even-numbered channel, information carried in a CC 1 and a CC 2 respectively includes: for the CC 1, 242 (same, 1), 242 (same, 1), a user information field of a STA 1, and a user information field of a STA 2; and for the CC 2, 242 (0), 242 (same, 2), a user information field of a STA 3, and a user information field of a STA 4.

It should be understood that the m-bit sequence may further indicate an RU with another size. For example, an m-bit sequence in the resource allocation table indicates a 484-tone RU, the 484-tone RU is one of a plurality of RUs that are allocated to four users for MU-MIMO performed by the four users, and the 484-tone RU corresponds to one user information field. For brief description, "484 (same, 1)" is used to mark the m-bit sequence. In other words, it may be considered that "484 (same, 1)" represents the m-bit sequence. The m-bit sequence indicates the 484-tone RU. The 484-tone RU is one of the plurality of RUs that are allocated to the four users for MU-MIMO performed by the four users. The 484-tone RU corresponds to one user information field. In addition, 484 (same, 2) represents an m-bit sequence. The m-bit sequence indicates a 484-tone RU. The 484-tone RU is one of a plurality of RUs that are allocated to four users for MU-MIMO performed by the four users. The 484-tone RU corresponds to two user information fields. In this case, information carried in the CC 1 and the CC 2 respectively includes: for the CC 1, 242 (same, 1), 484 (same, 1), a user information field of a STA 1, and a user information field of a STA 2; and for the CC 2, 242 (0), 484 (same, 2), a user information field of a STA 3, and a user information field of a STA 4.

It should be further understood that the m-bit sequence may further indicate an RU with another size. For example, an m-bit sequence in the resource allocation table indicates a 996 RU, the 996 RU is one of a plurality of RUs that are allocated to four users for MU-MIMO performed by the four users, and the 996 RU corresponds to k user information fields and is indicated by using 996 (same, k). For example, an m-bit sequence in the resource allocation table indicates a 2*996 RU, the 2*996 RU is one of a plurality of RUs that are allocated to four users for MU-MIMO performed by the four users, and the 2*996 RU corresponds to k user information fields and is indicated by using 2*996 (same, k).

Certainly, the m-bit sequence may indicate one of a plurality of RUs that are allocated to the n users for MU-MIMO performed by the n users. Herein, n=any one of 1 to 16. An example in which n=4 is merely used as an example. A specific value of n is not limited in this embodiment of this application.

(3) Downlink OFDMA Transmission

In the prior art, to reduce complexity of sending and receiving, one user/user group can be allocated with only one RU in OFDMA transmission.

An embodiment of this application further provides a resource indication method. In the method, a plurality of RUs can be allocated to one user/user group.

Specific solution 1:

In the resource indication method, a plurality of RUs can be allocated to one user.

The method includes the following:

An m-bit sequence in a resource allocation table indicates one of a plurality of RUs allocated to the user, and another m-bit sequence indicates one of a plurality of RUs allocated to another user.

For example, an m-bit sequence in the resource allocation table indicates a 242-tone RU in a plurality of RUs allocated to a user. For brief description, "242 (same, A)" is used to mark the m-bit sequence. Another m-bit sequence indicates one of a plurality of RUs allocated to another user. For brief description, "242 (same, B)" is used to mark the another m-bit sequence.

In the multi-user resource allocation shown in FIG. 17, resource allocation information (that is, an m-bit sequence) allocated to a STA 1 includes first 20 M, third 20 M, and fourth 20 M, and the resource allocation information corresponding to the three 20 M may be represented as 242 (same, A); and resource allocation information (that is, an m-bit sequence) allocated to a STA 2 includes fifth 20 M, seventh 20 M, and eighth 20 M, and the resource allocation information corresponding to the three 20 M may be represented as 242 (same, B). Second 20 M and sixth 20 M are 20 M divided into small RUs. It is assumed that resource allocation information (that is, an m-bit sequence) corresponding to second 20 M is represented by using X, and resource allocation information (that is, an m-bit sequence) corresponding to the sixth 20 M is represented by using Y. In a method for setting resource allocation information (that is, the m-bit sequence in the resource allocation table) of an odd-numbered channel and an even-numbered channel, information carried in a CC 1 and a CC 2 respectively includes: for the CC 1, 242 (same, A), 242 (same, A), 242 (same, B), and 242 (same, B); and for the CC 2, X, 242 (same, A), Y, and 242 (same, B).

Optionally, the CC 1 further includes a user information field of the STA 1, and the CC 2 further includes a user information field of the STA 2. In other words, information carried in the CC 1 and the CC 2 respectively includes: for the CC 1, 242 (same, A), 242 (same, A), 242 (same, B), 242 (same, B), and the user information field of the STA 1; and for the CC 2, X, 242 (same, A), Y, 242 (same, B), and the user information field of the STA 2.

Certainly, the CC 1 may alternatively include a user information field of the STA 2, and the CC 2 may include a user information field of the STA 1.

Certainly, the CC 1 may alternatively include a user information field of the STA 1 and a user information field of the STA 2, and the CC 2 may include the user information field of the STA 1 and the user information field of the STA 2.

It should be understood that in this method, the RU in the plurality of RUs allocated to the user may be an RU with any size, for example, a 242-tone RU, a 484-tone RU, a 996 RU, or a 2*996 RU; and similarly, the RU in the plurality of RUs allocated to the another user may also be an RU with any size, for example, a 242-tone RU, a 484-tone RU, a 996 RU, or a 2*996 RU. During one time of resource allocation, RUs with various sizes may be combined for allocation according to a specific case.

For example, the resource allocation in FIG. 17 may further be indicated as follows:

for the CC 1, 242 (same, A), 484 (same, A), 242 (same, B), and 484 (same, B); and for the CC 2, X, 484 (same, A), Y, and 484 (same, B).

Herein, 242 (same, A) represents an m-bit sequence, and the sequence indicates a 242-tone RU in a plurality of RUs allocated to a user; 484 (same, A) indicates an m-bit sequence, and the sequence indicates a 484-tone RU in the plurality of RUs allocated to the user; 242 (same, B) indicates an m-bit sequence, and the sequence indicates a 242-tone RU in a plurality of RUs allocated to another user; and 484 (same, B) represents an m-bit sequence, and the sequence indicates a 484-tone RU in the plurality of RUs allocated to the another user.

Specific solution 2:

A resource indication method includes the following:

An m-bit sequence in a resource allocation table indicates one of a plurality of RUs allocated to a user, and a quantity of user fields corresponding to the RU is 0. An m-bit sequence in the resource allocation table indicates one of a plurality of RUs allocated to a user, and a quantity of user fields corresponding to the RU is 1. An m-bit sequence in the resource allocation table indicates one of a plurality of RUs allocated to another user, and a quantity of user fields corresponding to the RU is 0. An m-bit sequence in the resource allocation table indicates one of a plurality of RUs allocated to another user, and a quantity of user fields corresponding to the RU is 1.

For example, an m-bit sequence in the resource allocation table indicates a 242-tone RU in a plurality of RUs allocated to a user, a quantity of user fields corresponding to the 242-tone RU is 0, and the m-bit sequence is indicated by using 242 (same, A, 0). An m-bit sequence in the resource allocation table indicates one of a plurality of RUs allocated to a user, a quantity of user fields corresponding to the RU is 1, and the m-bit sequence is indicated by using 242 (same, A, 1). An m-bit sequence in the resource allocation table indicates one of a plurality of RUs allocated to another user, a quantity of user fields corresponding to the RU is 0, and the m-bit sequence is indicated by using 242 (same, B, 0). An m-bit sequence in the resource allocation table indicates one of a plurality of RUs allocated to another user, a quantity of user fields corresponding to the RU is 1, and the m-bit sequence is indicated by using 242 (same, B, 1).

Optionally, if a user information field of a STA 1 and a user information field of a STA 2 are set on a CC 1, and the user information field of the STA 1 and the user information field of the STA 2 are also set on a CC 2, the resource allocation in FIG. 17 may be further indicated as follows:

for the CC 1, 242 (same, A, 1), 242 (same, A, 0), 242 (same, B, 1), 242 (same, B, 0), the user information field of the STA 1, and the user information field of the STA 2; and for the CC 2, X, 242 (same, A, 1), Y, 242 (same, B, 1), the user information field of the STA 1, and the user information field of the STA 2.

It should be understood that in this method, the RU in the plurality of RUs allocated to the user may be an RU with any size, for example, a 242-tone RU, a 484-tone RU, a 996 RU, or a 2*996 RU; and similarly, the RU in the plurality of RUs allocated to the another user may also be an RU with any size, for example, a 242-tone RU, a 484-tone RU, a 996 RU, or a 2*996 RU. During one time of resource allocation, RUs with various sizes may be combined for allocation according to a specific case.

Specific solution 3:

In the resource indication method, a plurality of RUs can be allocated to one user group. The method includes the following:

An m-bit sequence in a resource allocation table indicates one of the plurality of RUs allocated to the user group.

For example, an m-bit sequence in the resource allocation table indicates a 242-tone RU in the plurality of RUs allocated to the user group. As shown in FIG. 18, three 242-tone RUs (that is, fifth 20 M, seventh 20 M, and eighth 20 M) are allocated to a user group (the user group includes a STA 2 to a STA 5). Any one of the three 242-tone RUs may be indicated by using an m-bit sequence. For brief description, "242 (same, B, 4)" is used to mark the m-bit sequence.

In FIG. 18, first 20 M, third 20 M, and fourth 20 M are allocated to a user: a STA 1. Any one of the three 20 M may be indicated by using another m-bit sequence. For brief description, "242 (same, A, 1)" is used to mark the another m-bit sequence. Second 20 M and sixth 20 M in FIG. 18 are divided into small RUs, and may be respectively indicated by using an existing bit sequence already used in 11ax. For brief description, the second 20 M and the sixth 20 M are respectively marked by using X and Y. Therefore, information carried in a CC 1 and a CC 2 in FIG. 18 respectively includes: for the CC 1, 242 (same, A, 1), 242 (same, A, 1), 242 (same, B, 4), and 242 (same, B, 4); and for the CC 2, X, 242 (same, A, 1), Y, and 242 (same, B, 4).

Optionally, if the CC 1 further includes user information fields of the STA 1 to the STA 5, the CC 2 further includes a user information field of the second 20 M and a user information field of the sixth 20 M. Information carried in the CC 1 and the CC 2 respectively includes: for the CC 1, 242 (same, A, 1), 242 (same, A, 1), 242 (same, B, 4), 242 (same, B, 4), the user information field of the STA 1, the user information field of the STA 2, the user information field of the STA 3, the user information field of the STA 4, and the user information field of the STA 5; and for the CC 2, X, 242 (same, A, 1), Y, 242 (same, B, 4), the user information field of the second 20 M, and the user information field of the sixth 20 M.

In the foregoing, different stations to which a plurality of RUs are allocated are identified through identifier changes of A and B. In addition, in another manner, identifiers: A and B are separately allocated to two stations to which a plurality of RUs are allocated. If more stations to which a plurality of RUs are allocated need to be indicated, for example, three stations, more identifiers are needed for differentiation, for example, A, B, and C.

All the solutions in (1), (2), and (3) describe the information carried in the CC 1 and the CC 2. The CC 1 and the CC 2 are included in an EHT-SIG field. The EHT-SIG field is included in a PPDU. For a structure of the PPDU, refer to FIG. 11.

In a communication process, a transmit end generates and sends a PPDU. The PPDU includes an EHT-SIG field. The EHT-SIG field includes a CC 1 and a CC 2. For information carried in the CC 1 and the CC 2, refer to various specific solutions in (1), (2), and (3).

In all the solutions in (1), (2), and (3), a bit sequence is used to indicate one of a plurality of RUs allocated to one user/user group, and indicate a punctured channel with reference to existing 242 (0).

It should be understood that in addition to this method, a bitmap may also be used to indicate a punctured channel. A bandwidth puncturing bitmap is added to an EHT common field. For example, a 4-bit bitmap is used for an 80 M bandwidth, and a 16-bit bitmap or a 15-bit bitmap is used for a 320 MHz bandwidth. A bit in the bitmap is set to a first value to indicate that corresponding 20 M is punctured, or set to a second value to indicate that corresponding 20 M is not punctured. Alternatively, a bit in the bitmap is set to a first value to indicate that corresponding 20 M is not punctured, or set to a second value to indicate that corresponding 20 M is punctured. The bandwidth puncturing bitmap is specifically described in (4) in the following.

The bandwidth puncturing bitmap may be a bandwidth puncturing mode that is specifically described in (4) in the following.

In another manner, resource allocation information in the EHT common field may be omitted. For example, a bandwidth puncturing bitmap or a bandwidth puncturing mode in the EHT common field may be omitted. In addition, a bandwidth field in a U-SIG is replaced with a bandwidth and puncturing mode field. This is specifically described in (4) in the following.

The method of the bandwidth puncturing bitmap, the bandwidth puncturing mode, or the bandwidth and puncturing mode is preferably used in the solutions in (1) and (2), and optionally, in the solution in (3).

It should be further understood that, in all the solutions in (1), (2), and (3), the m-bit sequence is not limited to the m-bit sequence in the resource allocation table. The m-bit sequence may be an m-bit sequence in any other form.

(4) Uplink Full-Bandwidth MU-MIMO Punctured Transmission

In this embodiment, an indication method is provided for the uplink full-bandwidth MU-MIMO punctured transmission, to avoid the following case: A plurality of inconsecutive resource blocks are separately allocated to a MU-MIMO user group because a bandwidth is punctured, and consequently, a user information field of a user in the MU-MIMO user group is repeated a plurality of times. The full-bandwidth multi-user MU-MIMO punctured transmission shown in FIG. 14 is as an example. An AP allocates first 20 M and 40 M including third 20 M and fourth 20 M separately to a STA 1 to a STA 4. In this case, a trigger frame sent by the AP needs to include eight user information fields. Four user information fields in the eight user information fields include four user information fields of the STA 1 to the STA 4 to which the first 20 M is separately allocated. The remaining four user information fields in the eight user information fields include four user information fields of the STA 1 to the STA 4 to which the 40 M including the third 20 M and the fourth 20 M is separately allocated.

It can be learned that the trigger frame sent by the AP needs to include eight user information fields. This wastes a lot of resources.

This embodiment provides an indication method for uplink full-bandwidth MU-MIMO punctured transmission. The method includes the following:

A trigger frame is generated and sent. The trigger frame has the following features:

1. A trigger type field of the trigger frame may indicate the uplink full-bandwidth MU-MIMO punctured transmission. Alternatively, a bit or a field is added to a common information field of the trigger frame, and the bit or the field indicates the uplink full-bandwidth multi-user MU-MIMO punctured transmission. In addition, the uplink full-bandwidth MU-MIMO punctured transmission further optionally includes a special case, that is, uplink full-bandwidth single-user punctured transmission. The uplink full-bandwidth MU-MIMO punctured transmission may be further understood as indicating that the user information field includes a bandwidth puncturing bitmap field or a bandwidth puncturing mode field. Optionally, it is considered that an RU allocation indication field is not included.

2. An RU allocation field in a user information field is replaced with a bandwidth puncturing bitmap field or a bandwidth puncturing mode field. Each 20 M is indicated by using 1 bit. For example, an 80 M bandwidth is indicated by using a 4-bit bitmap, and a 320 MHz bandwidth is indicated by using a 16-bit bitmap. A bit in the bitmap is set to a first value to indicate that corresponding 20 M is punctured, or set to a second value to indicate that corresponding 20 M is not punctured. Alternatively, a bit in the bitmap is set to a first value to indicate that corresponding 20 M is not punctured, or set to a second value to indicate that corresponding 20 M is punctured. Alternatively, a length of the bandwidth puncturing bitmap does not change with the bandwidth. For example, the length of the bandwidth puncturing bitmap is 16 bits. In another form, because puncturing is not allowed for a primary 20 M channel in the bandwidth, 1 bit may be reduced from the puncturing bitmaps in the foregoing plurality of forms. For example, the length of the bandwidth puncturing bitmap does not change with the bandwidth. In this case, the length of the bandwidth puncturing bitmap is 15 bits. An indication indicating whether the primary 20 M is punctured is not included. Each 20 M in the bandwidth indicated by the bandwidth puncturing bitmap is arranged from a high frequency to a low frequency or from a low frequency to a high frequency.

The bandwidth puncturing mode field is also used to indicate specific punctured 20 M in the bandwidth. In this case, for a simple implementation, a mode indicated by the bandwidth puncturing mode field is limited. Puncturing is not implemented for any one or more of 20 MHz. The mode may include the following (a specific table is supplemented in the following).

TABLE 3

| Puncturing mode | |
| --- | --- |
| Mode number | Puncturing mode (each bit in a bitmap corresponds to one 20 M in a bandwidth, and bits from left to right may correspond to each 20 M in a bandwidth from a high frequency to a low frequency or from a low frequency to a high frequency, where a first value such as 1 indicates that corresponding 20 M exists, and a second value such as 0 indicates that corresponding 20 M is punctured) |
| 1 | 80 M bandwidth, 0111 |
| 2 | 80 M bandwidth, 1011 |
| 3 | 80 M bandwidth, 1101 |

TABLE 3-continued

Puncturing mode

| Mode number | Puncturing mode (each bit in a bitmap corresponds to one 20 M in a bandwidth, and bits from left to right may correspond to each 20 M in a bandwidth from a high frequency to a low frequency or from a low frequency to a high frequency, where a first value such as 1 indicates that corresponding 20 M exists, and a second value such as 0 indicates that corresponding 20 M is punctured) |
| --- | --- |
| 4 | 80 M bandwidth, 1110 |
| 5 | 160 M bandwidth, 00111111 |
| 6 | 160 M bandwidth, 11001111 |
| 7 | 160 M bandwidth, 11110011 |
| 8 | 160 M bandwidth, 11111100 |
| 9 | 160 M bandwidth, 01111111 |
| 10 | 160 M bandwidth, 10111111 |
| 11 | 160 M bandwidth, 11011111 |
| 12 | 160 M bandwidth, 11101111 |
| 13 | 160 M bandwidth, 11110111 |
| 14 | 160 M bandwidth, 11111011 |
| 15 | 160 M bandwidth, 11111101 |
| 16 | 160 M bandwidth, 11111110 |
| 17 | 240 M bandwidth, 000011111111 |
| 18 | 240 M bandwidth, 111100001111 |
| 19 | 240 M bandwidth, 111111110000 |
| 20 | 240 M bandwidth, 001111111111 |
| 21 | 240 M bandwidth, 110011111111 |
| 22 | 240 M bandwidth, 111100111111 |
| 23 | 240 M bandwidth, 111111001111 |
| 24 | 240 M bandwidth, 111111110011 |
| 25 | 240 M bandwidth, 111111111100 |
| 26 | 320 M bandwidth, 0000111111111111 |
| 27 | 320 M bandwidth, 1111000011111111 |
| 28 | 320 M bandwidth, 1111111100001111 |
| 29 | 320 M bandwidth, 1111111111110000 |
| 30 | 320 M bandwidth, 0011111111111111 |
| 31 | 320 M bandwidth, 1100111111111111 |
| 32 | 320 M bandwidth, 1111001111111111 |
| 33 | 320 M bandwidth, 1111110011111111 |
| 34 | 320 M bandwidth, 1111111100111111 |
| 35 | 320 M bandwidth, 1111111111001111 |
| 36 | 320 M bandwidth, 1111111111110011 |
| 37 | 320 M bandwidth, 1111111111111100 |
| . . . | . . . |

Because the puncturing mode indicated by the bandwidth puncturing mode field is limited, the modes included in the foregoing table only need 6 bits for indication. If more puncturing modes are included subsequently, a length of the bandwidth puncturing mode field may further be 7 bits, 8 bits, 9 bits, or another quantity of bits.

In another manner, a plurality of puncturing modes indicated by the bandwidth puncturing mode field change with a bandwidth. The bandwidth is indicated by the bandwidth field in the trigger frame. Specifically, when the bandwidth is 20 M or 40 M, there is no puncturing mode. In this case, the bandwidth puncturing mode field may be 0 bits. When the bandwidth is 80 M, modes indicated by the bandwidth puncturing mode field include mode numbers: 1 to 4, which requires 2 bits. When the bandwidth is 160 M, modes indicated by the bandwidth puncturing mode field include mode numbers: 5 to 16, which requires 4 bits. When the bandwidth is 240 M, modes indicated by the bandwidth puncturing mode field include mode numbers: 17 to 25, which requires 4 bits. When the bandwidth is 320 M, modes indicated by the bandwidth puncturing mode field include mode numbers: 26 to 37, which requires 4 bits. A preferred manner is that the mode indicated by the bandwidth puncturing mode field changes with the bandwidth, but the length does not change. In the foregoing examples, the length of the bandwidth puncturing mode field is a maximum quantity of bits required for all the bandwidths, that is, 4. For example, when the bandwidth is 80 M, modes indicated by the bandwidth puncturing mode field include mode numbers: 1 to 4. Herein, values 0 to 3 of the bandwidth puncturing mode field with the length of 4 bits respectively indicate mode numbers: 1 to 4. Other values are reserved values.

It should be noted that the 160 M bandwidth may include two 80 M, where the two 80 M are not consecutive; or may include contiguous 160 M. The 240 M bandwidth may include 160 M and 80 M, where 160 M and 80 M are not consecutive; or may include contiguous 240 M. The 320 M bandwidth may include two 160 M, where the two 160 M are not consecutive; or may include contiguous 320 M.

The following provides a method for further reducing signaling overheads for a trigger frame. In a full-bandwidth puncturing mode, not only user information field that carries a duplicate AID can be avoided, but also an RU allocation indication field/a bandwidth puncturing bitmap field/a bandwidth puncturing mode field of the user information field can be omitted. This is specifically as follows:

1. The trigger type field of the trigger frame may indicate uplink full-bandwidth MU-MIMO punctured transmission. The uplink full-bandwidth MU-MIMO punctured transmission further optionally includes a special case, that is, uplink full-bandwidth single-user punctured transmission.

2. The user information field of the trigger frame does not include resource allocation information, for example, an RU allocation field, a bandwidth puncturing bitmap field, or a bandwidth puncturing mode field.

3. The bandwidth field in the common field of the trigger frame is replaced with a bandwidth puncturing bitmap field or a bandwidth and puncturing mode field.

The uplink full-bandwidth MU-MIMO punctured transmission may be further understood as indicating that the user information field does not include information related to resource allocation, for example, a bandwidth puncturing bitmap field, a bandwidth and puncturing mode field, or an RU allocation indication field. Optionally, the common field of the trigger frame includes a bandwidth puncturing bitmap field or a bandwidth and puncturing mode field.

The bandwidth puncturing bitmap field is the same as that in the foregoing method. However, in this case, the bandwidth puncturing bitmap field has a fixed length, for example, 15 bits or 16 bits. The bandwidth puncturing bitmap may be all a first value, for example, 1, to indicate that all 20 M are not punctured. If the bandwidth puncturing bitmap includes consecutive is and other values are 0s, it indicates that the bandwidth is not punctured.

Six non-puncturing bandwidth modes are added to the puncturing mode in Table 1 for the bandwidth and puncturing mode field, including 20 M, 40 M, 80 M, 160, 240 M, and 320 M. In other words, at least 43 modes are included. The bandwidth and puncturing mode field may be 6 bits. If more modes are further included subsequently, the bandwidth and puncturing mode field may be 7 bits, 8 bits, 9 bits, or another quantity of bits.

It should be noted that the primary 20 M in the bandwidth cannot be punctured.

If the full-bandwidth multi-user MU-MIMO punctured transmission shown in FIG. 14 is indicated by using a trigger frame having the foregoing two features, the trigger frame only needs to include four user information fields, and an RU allocation field in each user information field is replaced with a bandwidth puncturing bitmap field.

Based on the same technical concept, an embodiment of this application provides a computer-readable storage medium. The computer-readable storage medium stores a computer instruction. When the instruction is run on a computer, the computer is enabled to perform the information indication method on an AP side in the foregoing method embodiments.

An embodiment of this application provides a computer program product including instructions. When the computer program product is run on a computer, the computer is enabled to perform the method embodiments in either one of the first aspect and the second aspect or any one of the possible implementations of these aspects.

An embodiment of this application further provides a chip system. The chip system includes a processor, configured to support an AP in implementing the information indication method, for example, generating or processing data and/or information in the foregoing aspects. In a possible design, the chip system further includes a memory. The memory is configured to store program instructions and data that are necessary for a data sending device. The chip system may include a chip, or may include a chip and another discrete device.

An embodiment of this application further provides a communications system. The system includes at least one first access point and at least one first STA in the foregoing aspects.

A person skilled in the art should understand that the embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes instructions apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the protection scope defined by the following claims and their equivalent technologies.

What is claimed is:

1. A method, comprising:

generating, by an access point (AP), a physical layer protocol data unit (PPDU), wherein a preamble of the PPDU comprises a universal signal (U-SIG) field, wherein the U-SIG field comprises first indication information indicating a transmission mode of the PPDU, and wherein the transmission mode of the PPDU comprises a full-bandwidth multi-user multiple-input multiple-output (MU-MIMO) transmission, a full-bandwidth MU-MIMO punctured transmission, or an orthogonal frequency division multiple access (OFDMA) transmission, wherein the first indication information is carried in two fields of the U-SIG field, one of which is a PPDU format field and the other of which is a puncturing field, and wherein the PPDU format field indicates a format of the PPDU, the format of the PPDU comprises an MU-MIMO PPDU or an OFDMA PPDU, and wherein the puncturing field indicates whether to perform punctured transmission; and sending, by the AP, the PPDU.

2. The method according to claim 1, wherein the preamble of the PPDU comprises an extremely high throughput signal (EHT-SIG) field, wherein the EHT-SIG field comprises a common field and a user specific field, wherein the user specific field comprises one or more user fields, and wherein the user specific field comprises an association identifier (AID) of a station (STA).

3. The method according to claim 2, wherein, when the first indication information indicates the full-bandwidth MU-MIMO transmission or the full-bandwidth MU-MIMO punctured transmission, the common field comprises no resource allocation information.

4. The method according to claim 2, wherein, when the first indication information indicates the OFDMA transmission, the common field comprises resource allocation information.

5. The method according to claim 2, wherein the U-SIG field comprises a bandwidth field, and wherein, when a bandwidth of the PPDU indicated by the bandwidth field is greater than 20 MHz, the user specific field on each content channel comprises one user field.

6. The method according to claim 2, wherein resource allocation information in the common field comprises one or more bit sequences, wherein the one or more bit sequences indicate that spectrum resources are divided into several sets of resource units, wherein the several sets of resource units include one or more resource units, and wherein the one or more resource units are allocated to one or more STAs.

7. The method according to claim 6, wherein the one or more bit sequences occupy 9 bits.

8. The method according to claim 6, wherein the one or more bit sequences indicate a size and a location of the several sets of resource units, or wherein the one or more bit sequences indicate the size and the location of the several sets of resource units, and a quantity of STAs, or wherein the one or more bit sequences indicate the size and the location of the several sets of resource units, and a quantity of user information fields corresponding to the several sets of resource units.

9. The method according to claim 6, wherein the resource allocation information further indicates a final resource unit of a set of resource units allocated to a previous STA in two adjacent STAs.

10. The method according to claim 1, wherein the PPDU further comprises second indication information, and wherein the second indication information indicates a quantity of STAs.

11. The method according to claim 1, wherein the puncturing field occupies multiple bits, one value of which indicates that the PPDU is not punctured.

12. A method, comprising:

receiving, by a station (STA), a physical layer protocol data unit (PPDU), wherein a preamble of the PPDU comprises a universal signal (U-SIG) field, wherein the U-SIG field comprises first indication information indicating a transmission mode of the PPDU, and wherein the transmission mode of the PPDU comprises a full-bandwidth multi-user multiple-input multiple-output (MU-MIMO) transmission, a full-bandwidth MU-MIMO punctured transmission, or an orthogonal frequency division multiple access (OFDMA) transmission, wherein the first indication information is carried in two fields of the U-SIG field, one of which is a PPDU format field and the other of which is a puncturing field, and wherein the PPDU format field indicates a format of the PPDU, the format of the PPDU comprises an MU-MIMO PPDU or an OFDMA PPDU, and wherein the puncturing field indicates whether to perform punctured transmission; and determining, by the STA, the transmission mode of the PPDU according to the first indication information.

13. The method according to claim 12, wherein the preamble of the PPDU comprises an extremely high throughput signal (EHT-SIG field), wherein the EHT-SIG field comprises a common field and a user specific field, wherein the user specific field comprises one or more user fields, the user specific field comprises an association identifier (AID) of the STA.

14. The method according to claim 13, wherein, when the first indication information indicates the full-bandwidth MU-MIMO transmission or the full-bandwidth MU-MIMO punctured transmission, the common field comprises no resource allocation information.

15. The method according to claim 13, wherein, when the first indication information indicates the OFDMA transmission, the common field comprises resource allocation information.

16. The method according to claim 13, the U-SIG field comprises a bandwidth field, and wherein when a bandwidth of the PPDU indicated by the bandwidth field is greater than 20 MHz, the user specific field on each content channel comprises one user field.

17. The method according to claim 13, wherein resource allocation information in the common field comprises one or more bit sequences, wherein the one or more bit sequences indicate that spectrum resources are divided into several sets of resource units, wherein the several sets of resource units include one or more resource units, and wherein the one or more resource units are allocated to one or more STAs.

18. The method according to claim 17, wherein the one or more bit sequences occupy 9 bits.

19. The method according to claim 17, wherein the one or more bit sequences indicate a size and a location of the several sets of resource units, or wherein the one or more bit sequences indicate the size and the location of the several sets of resource units, and a quantity of STAs, or wherein the one or more bit sequences indicate the size and the location of the several sets of resource units, and a quantity of user information fields corresponding to the several sets of resource units.

20. The method according to claim 17, wherein the resource allocation information further indicates a final resource unit of a set of resource units allocated to a previous STA in two adjacent STAs.

21. The method according to claim 20, wherein the PPDU further comprises second indication information, and wherein the second indication information indicates a quantity of STAs.

22. The method according to claim 12, wherein the puncturing field occupies multiple bits, one value of which indicates that the PPDU is not punctured.

23. An apparatus, comprising:

at least one processor;

a transceiver configured to communicate with the at least one processor through an internal connection; and a non-transitory computer readable storage medium storing programming, the programming including instructions that, when executed by the at least one processor, cause the apparatus to:

generate a physical layer protocol data unit (PPDU), wherein a preamble of the PPDU comprises a universal signal (U-SIG) field, wherein the U-SIG field comprises first indication information indicating a transmission mode of the PPDU, and wherein the transmission mode of the PPDU comprises a full-bandwidth multi-user multiple-input multiple-output (MU-MIMO) transmission, a full-bandwidth MU-MIMO punctured transmission, or an orthogonal frequency division multiple access (OFDMA) transmission, wherein the first indication information is carried in two fields of the U-SIG field, one of which is a PPDU format field and the other of which is a puncturing field, and wherein the PPDU format field indicates a format of the PPDU, the format of the PPDU comprises an MU-MIMO PPDU or an OFDMA PPDU, and wherein the puncturing field indicates whether to perform punctured transmission; and control the transceiver to send the PPDU.

24. The apparatus according to claim 23, wherein the preamble of the PPDU comprises an extremely high throughput signal (EHT-SIG) field, wherein the EHT-SIG field comprises a common field and a user specific field, wherein the user specific field comprises one or more user fields, and wherein the user specific field comprises an association identifier (AID) of a station (STA).

25. The apparatus according to claim 24, wherein, when the first indication information indicates the full-bandwidth MU-MIMO transmission or the full-bandwidth MU-MIMO punctured transmission, the common field comprises no resource allocation information.

26. The apparatus according to claim 24, wherein, when the first indication information indicates the OFDMA transmission, the common field comprises resource allocation information.

27. The apparatus according to claim 24, wherein the U-SIG field comprises a bandwidth field, and wherein, when a bandwidth of the PPDU indicated by the bandwidth field is greater than 20 MHz, the user specific field on each content channel comprises one user field.

* * * * *